(12) United States Patent
Harris et al.

(10) Patent No.: US 12,373,705 B2
(45) Date of Patent: Jul. 29, 2025

(54) METHOD, SYSTEM, AND COMPUTER PROGRAM PRODUCT FOR CONTROLLING GENETIC LEARNING FOR PREDICTIVE MODELS USING PREDEFINED STRATEGIES

(71) Applicant: Visa International Service Association, San Francisco, CA (US)

(72) Inventors: Theodore David Harris, San Francisco, CA (US); Tatiana Korolevskaya, Mountain View, CA (US); Yue Li, Sunnyvale, CA (US); Craig O'Connell, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 1009 days.

(21) Appl. No.: 17/433,724

(22) PCT Filed: Mar. 20, 2019

(86) PCT No.: PCT/US2019/023140
§ 371 (c)(1),
(2) Date: Aug. 25, 2021

(87) PCT Pub. No.: WO2020/190287
PCT Pub. Date: Sep. 24, 2020

(65) Prior Publication Data
US 2022/0051108 A1 Feb. 17, 2022

(51) Int. Cl.
*G06N 3/126* (2023.01)
*G06N 5/04* (2023.01)
(52) U.S. Cl.
CPC ............... *G06N 3/126* (2013.01); *G06N 5/04* (2013.01)

(58) Field of Classification Search
CPC ................................. G06N 3/126; G06N 5/04
See application file for complete search history.

(56) References Cited

U.S. PATENT DOCUMENTS 10,635,978 B2 * 4/2020 Andoni ................... G06N 3/048
10,657,447 B1 * 5/2020 McDonnell ............ G06N 3/082
(Continued)

OTHER PUBLICATIONS

Oron et al "A new crossover mechanism for genetic algorithm with rank-based selection method," 2018 5th International Conference on Business and Industrial Research (ICBIR) Bangkok, Thailand, 2018, pp. 83-88, doi: 10.1109/ICBIR.2018.8391171 (Year: 2018).*

*Primary Examiner* — Barbara M Level
(74) *Attorney, Agent, or Firm* — The Webb Law Firm

(57) ABSTRACT

Methods for controlling genetic learning for predictive models using predefined strategies may include, for each of a plurality of agents, selecting a type of predictive model. A strategy may be selected from predefined strategies. Candidate genomes may be generated and may include a plurality of genes. Each gene may be associated with a feature of the agent predictive model. A fit of each candidate genome to the agent strategy may be determined. A candidate genome may be selected based on the fit. For each of a plurality of epochs, a plurality of training iterations may be performed for each agent. A fitness of each agent predictive model may be determined. A subset of agents with a highest fitness may be determined. For each agent of the subset, at least one new agent may be generated. The genomes of the new agents may be merged with some genomes of the subset.

17 Claims, 16 Drawing Sheets

(56) References Cited

U.S. PATENT DOCUMENTS

| | | | |
|---|---|---|---|
| 2004/0254901 A1* | 12/2004 | Bonabeau | G06N 3/126 706/13 |
| 2005/0131790 A1 | 6/2005 | Benzschawel et al. | |
| 2007/0005522 A1* | 1/2007 | Wren | G06N 3/126 706/13 |
| 2008/0077544 A1* | 3/2008 | Sureka | G06N 7/01 706/13 |
| 2008/0154808 A1* | 6/2008 | Grieco | G06N 3/126 706/13 |
| 2008/0208548 A1 | 8/2008 | Metzger et al. | |
| 2009/0070281 A1* | 3/2009 | Solomon | G06N 3/12 706/13 |
| 2017/0220943 A1* | 8/2017 | Duncan | G06N 5/04 |
| 2017/0228639 A1 | 8/2017 | Hara et al. | |
| 2018/0253649 A1* | 9/2018 | Miikkulainen | G06Q 30/0277 |
| 2018/0300630 A1* | 10/2018 | Andoni | G06F 16/245 |
| 2018/0314938 A1* | 11/2018 | Andoni | G06N 3/105 |
| 2021/0042661 A1* | 2/2021 | St-Onge | G06N 3/126 |

* cited by examiner

METHOD, SYSTEM, AND COMPUTER PROGRAM PRODUCT FOR CONTROLLING GENETIC LEARNING FOR PREDICTIVE MODELS USING PREDEFINED STRATEGIES

CROSS-REFERENCE TO RELATED APPLICATION

This application is the United States national phase of International Application No. PCT/US2019/023140 filed Mar. 20, 2019 the entire disclosure of which is hereby incorporated by reference in its entirety.

BACKGROUND

1. Technical Field

This disclosed subject matter relates generally to methods, systems, and products for controlling genetic learning for predictive models and, in some particular embodiments or aspects, to a method, system, and computer program product for controlling genetic learning for predictive models using predefined strategies.

2. Technical Considerations

Certain predictive modeling, machine learning (ML), and/or artificial intelligence (AI) techniques may be used to solve problems, classify information, and/or the like. The quality, accuracy, sophistication, and/or the like of existing predictive modeling, ML, and AI techniques may improve over time, and new predictive modeling, ML, and AI techniques may become available over time. Additionally or alternatively, the power of individual computing devices and/or distributed computing systems may increase over time. For example, using more power computing devices/systems to perform the predictive modeling, ML, and AI techniques may further improve the use of such techniques.

However, such predictive modeling, ML, and AI techniques may rely on human interactions. For example, human interaction may be necessary to design, build, and/or generate the models. Additionally or alternatively, human interaction may be necessary to design, set up, and/or operate systems using the predictive modeling, ML, and AI techniques and/or to respond to and/or interpret the output of such systems. Additionally or alternatively, human interaction may be necessary to define the problem to be solved and/or the goals to be achieved in solving the problem. Furthermore, there may be difficulty in responding to unfamiliar inputs (e.g., external stimuli, and/or the like) when using such static predictive modeling, ML, and AI models and/or systems that are highly reliant on human interactions. For example, there may be difficulty in fully addressing problems such as disaster response, strategic insights on breaking news, adjusting systems to accommodate events, and/or mitigating zero-day exploit impacts when static predictive modeling, ML, and AI models are used and/or when systems are highly reliant on human interactions.

SUMMARY

Accordingly, it is an object of the presently disclosed subject matter to provide methods, systems, and computer program products for controlling genetic learning for predictive models, e.g., using predefined strategies.

According to non-limiting embodiments or aspects, provided is a method for controlling genetic learning for predictive models using predefined strategies. In some non-limiting embodiments or aspects, a method for controlling genetic learning for predictive models using predefined strategies may include, for each agent of a plurality of agents, selecting a type of predictive model from a plurality of types of predictive models as an agent predictive model. A strategy may be selected from a plurality of predefined strategies as an agent strategy. A plurality of candidate genomes may be generated. Each genome may include a plurality of genes, and each gene may be associated with a respective feature of the agent predictive model. A fit of each candidate genome of the plurality of candidate genomes to the agent strategy may be determined. A candidate genome may be selected from the plurality of candidate genomes as the agent genome based on the fit of the candidate genome. For each epoch of a plurality of epochs, and for each agent, a plurality of training iterations may be performed based on the agent predictive model and the agent genome. A fitness of each agent predictive model may be determined after the plurality of training iterations. For each epoch, a first subset of agents with a highest fitness may be determined. For each agent of the first subset of agents, at least one new agent may be generated to add to the plurality of agents. The genome(s) of the new agent(s) may be merged with the genome of at least one agent of the first subset of agents.

In some non-limiting embodiments or aspects, a master template may be loaded. Additionally or alternatively, the master template may include a number of agents of the plurality of agents. In some non-limiting embodiments or aspects, the master template may include a plurality of agent templates. Additionally or alternatively, selecting the type of predictive model may include selecting the type of predictive model based on a subset of the plurality of types of predictive models associated with a respective agent template of the plurality of agent templates for each agent. In some non-limiting embodiments or aspects, each agent template may include at least one predictive model template. Additionally or alternatively, selecting the type of predictive model may include selecting one of the predictive model template(s) based on the respective agent template for each agent. In some non-limiting embodiments or aspects, the master template may include goal data associated with at least one condition. Additionally or alternatively, for each epoch of the plurality of epochs, whether the at least one agent predictive model of the plurality of agents satisfies the at least one condition associated with the goal data may be determined. Additionally or alternatively, the plurality of epochs may be terminated based on determining that the at least one agent predictive model of the plurality of agents satisfies the at least one condition associated with the goal data.

In some non-limiting embodiments or aspects, for each epoch of the plurality of epochs, a second subset of agents with a lowest fitness may be determined. Additionally or alternatively, the at least one new agent may be filtered based on the second subset of agents.

In some non-limiting embodiments or aspects, generating the at least one new agent may include generating at least three new agents. In some non-limiting embodiments or aspects, the new agents may include a first new agent, a second new agent, and a third new agent. Additionally or alternatively, merging the genome of the new agent(s) with the agent genome of at least one agent of the first subset of agents may include merging the genome of the first new agent with the agent genome of a first agent of the first subset of agents having a most different strategy. Additionally or alternatively, the genome of the second new agent may be merged with the agent genome of a second agent of the first subset of agents having a highest fitness. Additionally or alternatively, the genome of the third new agent may be merged with the agent genome of a third agent of the first subset of agents having a most similar winning strategy.

According to non-limiting embodiments or aspects, provided is a system for controlling genetic learning for predictive models using predefined strategies. In some non-limiting embodiments or aspects, the system for controlling genetic learning for predictive models using predefined strategies may include at least one processor and at least one non-transitory computer-readable medium including one or more instructions that, when executed by at least one processor, cause the at least one processor to, for each agent of a plurality of agents, select a type of predictive model from a plurality of types of predictive models as an agent predictive model. A strategy may be selected from a plurality of predefined strategies as an agent strategy. A plurality of candidate genomes may be generated. Each genome may include a plurality of genes, and each gene may be associated with a respective feature of the agent predictive model. A fit of each candidate genome of the plurality of candidate genomes to the agent strategy may be determined. A candidate genome may be selected from the plurality of candidate genomes as the agent genome based on the fit of the candidate genome. For each epoch of a plurality of epochs, and for each agent, a plurality of training iterations may be performed based on the agent predictive model and the agent genome. A fitness of each agent predictive model may be determined after the plurality of training iterations. For each epoch, a first subset of agents with a highest fitness may be determined. For each agent of the first subset of agents, at least one new agent may be generated to add to the plurality of agents. The genome(s) of the new agent(s) may be merged with the genome of at least one agent of the first subset of agents.

In some non-limiting embodiments or aspects, a master template may be loaded. Additionally or alternatively, the master template may include a number of agents of the plurality of agents. In some non-limiting embodiments or aspects, the master template may include a plurality of agent templates. Additionally or alternatively, selecting the type of predictive model may include selecting the type of predictive model based on a subset of the plurality of types of predictive models associated with a respective agent template of the plurality of agent templates for each agent. In some non-limiting embodiments or aspects, each agent template may include at least one predictive model template. Additionally or alternatively, selecting the type of predictive model may include selecting one of the predictive model template(s) based on the respective agent template for each agent. In some non-limiting embodiments or aspects, the master template may include goal data associated with at least one condition. Additionally or alternatively, for each epoch of the plurality of epochs, whether the at least one agent predictive model of the plurality of agents satisfies the at least one condition associated with the goal data may be determined. Additionally or alternatively, the plurality of epochs may be terminated based on determining that the at least one agent predictive model of the plurality of agents satisfies the at least one condition associated with the goal data.

In some non-limiting embodiments or aspects, for each epoch of the plurality of epochs, a second subset of agents with a lowest fitness may be determined. Additionally or alternatively, the at least one new agent may be filtered based on the second subset of agents.

In some non-limiting embodiments or aspects, generating the at least one new agent may include generating at least three new agents. In some non-limiting embodiments or aspects, the new agents may include a first new agent, a second new agent, and a third new agent. Additionally or alternatively, merging the genome of the new agent(s) with the agent genome of at least one agent of the first subset of agents may include merging the genome of the first new agent with the agent genome of a first agent of the first subset of agents having a most different strategy. Additionally or alternatively, the genome of the second new agent may be merged with the agent genome of a second agent of the first subset of agents having a highest fitness. Additionally or alternatively, the genome of the third new agent may be merged with the agent genome of a third agent of the first subset of agents having a most similar winning strategy.

According to non-limiting embodiments or aspects, provided is a computer program product for controlling genetic learning for predictive models using predefined strategies. The computer program product may include at least one non-transitory computer-readable medium including one or more instructions that, when executed by at least one processor, cause the at least one processor to, for each agent of a plurality of agents, select a type of predictive model from a plurality of types of predictive models as an agent predictive model. A strategy may be selected from a plurality of predefined strategies as an agent strategy. A plurality of candidate genomes may be generated. Each genome may include a plurality of genes, and each gene may be associated with a respective feature of the agent predictive model. A fit of each candidate genome of the plurality of candidate genomes to the agent strategy may be determined. A candidate genome may be selected from the plurality of candidate genomes as the agent genome based on the fit of the candidate genome. For each epoch of a plurality of epochs, and for each agent, a plurality of training iterations may be performed based on the agent predictive model and the agent genome. A fitness of each agent predictive model may be determined after the plurality of training iterations. For each epoch, a first subset of agents with a highest fitness may be determined. For each agent of the first subset of agents, at least one new agent may be generated to add to the plurality of agents. The genome(s) of the new agent(s) may be merged with the genome of at least one agent of the first subset of agents.

In some non-limiting embodiments or aspects, a master template may be loaded. Additionally or alternatively, the master template may include a number of agents of the plurality of agents. In some non-limiting embodiments or aspects, the master template may include a plurality of agent templates. Additionally or alternatively, selecting the type of predictive model may include selecting the type of predictive model based on a subset of the plurality of types of predictive models associated with a respective agent template of the plurality of agent templates for each agent. In some non-limiting embodiments or aspects, each agent template may include at least one predictive model template. Additionally or alternatively, selecting the type of predictive model may include selecting one of the predictive model template(s) based on the respective agent template for each agent. In some non-limiting embodiments or aspects, the master template may include goal data associated with at least one condition. Additionally or alternatively, for each epoch of the plurality of epochs, whether the at least one agent predictive model of the plurality of agents satisfies the at least one condition associated with the goal data may be determined. Additionally or alternatively, the plurality of epochs may be terminated based on determining that the at least one agent predictive model of the plurality of agents satisfies the at least one condition associated with the goal data.

In some non-limiting embodiments or aspects, for each epoch of the plurality of epochs, a second subset of agents with a lowest fitness may be determined. Additionally or alternatively, the at least one new agent may be filtered based on the second subset of agents.

In some non-limiting embodiments or aspects, generating the at least one new agent may include generating at least three new agents. In some non-limiting embodiments or aspects, the new agents may include a first new agent, a second new agent, and a third new agent. Additionally or alternatively, merging the genome of the new agent(s) with the agent genome of at least one agent of the first subset of agents may include merging the genome of the first new agent with the agent genome of a first agent of the first subset of agents having a most different strategy. Additionally or alternatively, the genome of the second new agent may be merged with the agent genome of a second agent of the first subset of agents having a highest fitness. Additionally or alternatively, the genome of the third new agent may be merged with the agent genome of a third agent of the first subset of agents having a most similar winning strategy.

Further non-limiting embodiments or aspects are set forth in the following numbered clauses:

Clause 1: A method for controlling genetic learning for predictive models using predefined strategies, comprising: for each agent of a plurality of agents: selecting, with at least one processor, a type of predictive model from a plurality of types of predictive models as an agent predictive model; selecting, with at least one processor, a strategy from a plurality of predefined strategies as an agent strategy; generating, with at least one processor, a plurality of candidate genomes, each candidate genome comprising a plurality of genes, each gene associated with a respective feature of the agent predictive model; determining, with at least one processor, a fit of each candidate genome of the plurality of candidate genomes to the agent strategy; and selecting, with at least one processor, a candidate genome from the plurality of candidate genomes as the agent genome based on the fit of the candidate genome; for each epoch of a plurality of epochs: for each agent of the plurality of agents: performing, with at least one processor, a plurality of training iterations based on the agent predictive model and the agent genome; and determining, with at least one processor, a fitness of the agent predictive model after the plurality of training iterations; determining, with at least one processor, a first subset of agents with a highest fitness; for each agent of the first subset of agents: generating, with at least one processor, at least one new agent to add to the plurality of agents; and merging, with at least one processor, a genome of the at least one new agent with the agent genome of at least one agent of the first subset of agents.

Clause 2: The method of clause 1, further comprising loading, with at least one processor, a master template comprising a number of agents of the plurality of agents.

Clause 3: The method of clauses 1 or 2, wherein the master template further comprises a plurality of agent templates, wherein selecting the type of predictive model comprises selecting, with at least one processor, the type of predictive model based on a subset of the plurality of types of predictive models associated with a respective agent template of the plurality of agent templates for each agent.

Clause 4: The method of any preceding clause, wherein each agent template of the plurality of agent templates further comprises at least one predictive model template, wherein selecting the type of predictive model comprises selecting, with at least one processor, one of the at least one predictive model template based on the respective agent template for each agent.

Clause 5: The method of any preceding clause, wherein the master template further comprises goal data associated with at least one condition, the method further comprising: for each epoch of the plurality of epochs: determining, with at least one processor, whether the at least one agent predictive model of the plurality of agents satisfies the at least one condition associated with the goal data; and terminating, with at least one processor, the plurality of epochs based on determining the at least one agent predictive model of the plurality of agents satisfies the at least one condition associated with the goal data.

Clause 6: The method of any preceding clause, further comprising, for each epoch of the plurality of epochs: determining, with at least one processor, a second subset of agents with a lowest fitness.

Clause 7: The method of any preceding clause, further comprising, for each epoch of the plurality of epochs: filtering, with at least one processor, the at least one new agent based on the second subset of agents.

Clause 8: The method of any preceding clause, wherein generating the at least one new agent comprises generating, with at least one processor, at least three new agents.

Clause 9: The method of any preceding clause, wherein the at least three new agents comprise a first new agent, a second new agent, and a third new agent, and wherein merging the genome of the at least one new agent with the agent genome of at least one agent of the first subset of agents comprises: merging, with at least one processor, the genome of the first new agent with the agent genome of a first agent of the first subset of agents having a most different strategy; merging, with at least one processor, the genome of the second new agent with the agent genome of a second agent of the first subset of agents having a highest fitness; and merging, with at least one processor, the genome of the third new agent with the agent genome of a third agent of the first subset of agents having a most similar winning strategy.

Clause 10: A system for controlling genetic learning for predictive models using predefined strategies, comprising: at least one processor; and at least one non-transitory computer-readable medium including one or more instructions that, when executed by at least one processor, cause the at least one processor to: for each agent of a plurality of agents: select a type of predictive model from a plurality of types of predictive models as an agent predictive model; select a strategy from a plurality of predefined strategies as an agent strategy; generate a plurality of candidate genomes, each genome comprising a plurality of genes, each gene associated with a respective feature of the agent predictive model; determine a fit of each candidate genome of the plurality of candidate genomes to the agent strategy; and select a candidate genome from the plurality of candidate genomes as the agent genome based on the fit of the candidate genome; for each epoch of a plurality of epochs: for each agent of the plurality of agents: perform a plurality of training iterations based on the agent predictive model and the agent genome; and determine a fitness of the agent predictive model after the plurality of training iterations; determine a first subset of agents with a highest fitness; for each agent of the first subset of agents: generate at least one new agent to add to the plurality of agents; and merge a genome of the at least one new agent with the agent genome of at least one agent of the first subset of agents.

Clause 11: The system of clause 10, wherein the one or more instructions, when executed by the at least one processor, further cause the at least one processor to load a master template comprising a number of agents of the plurality of agents.

Clause 12: The system of clauses 10 or 11, wherein the master template further comprises a plurality of agent templates, wherein selecting the type of predictive model comprises selecting the type of predictive model based on a subset of the plurality of types of predictive models associated with a respective agent template of the plurality of agent templates for each agent.

Clause 13: The system of any one of clauses 10-12, wherein each agent template of the plurality of agent templates further comprises at least one predictive model template, wherein selecting the type of predictive model comprises selecting one of the at least one predictive model template based on the respective agent template for each agent.

Clause 14: The system of any one of clauses 10-13, wherein the master template further comprises goal data associated with at least one condition, and wherein the one or more instructions, when executed by the at least one processor, further cause the at least one processor to: for each epoch of the plurality of epochs: determine whether the at least one agent predictive model of the plurality of agents satisfies the at least one condition associated with the goal data; and terminate the plurality of epochs based on determining the at least one agent predictive model of the plurality of agents satisfies the at least one condition associated with the goal data.

Clause 15: The system of any one of clauses 10-14, wherein the one or more instructions, when executed by the at least one processor, further cause the at least one processor to, for each epoch of the plurality of epochs: determine a second subset of agents with a lowest fitness.

Clause 16: The system of any one of clauses 10-15, wherein the one or more instructions, when executed by the at least one processor, further cause the at least one processor to, for each epoch of the plurality of epochs: filter the at least one new agent based on the second subset of agents.

Clause 17: The system of any one of clauses 10-16, wherein generating the at least one new agent comprises generating at least three new agents.

Clause 18: The system of any one of clauses 10-17, wherein the at least three new agents comprise a first new agent, a second new agent, and a third new agent, and wherein merging the genome of the at least one new agent with the agent genome of at least one agent of the first subset of agents comprises: merging the genome of the first new agent with the agent genome of a first agent of the first subset of agents having a most different strategy; merging the genome of the second new agent with the agent genome of a second agent of the first subset of agents having a highest fitness; and merging the genome of the third new agent with the agent genome of a third agent of the first subset of agents having a most similar winning strategy.

Clause 19: A computer program product for controlling genetic learning for predictive models using predefined strategies, the computer program product comprising at least one non-transitory computer-readable medium including one or more instructions that, when executed by at least one processor, cause the at least one processor to: for each agent of a plurality of agents: select a type of predictive model from a plurality of types of predictive models as an agent predictive model; select a strategy from a plurality of predefined strategies as an agent strategy; generate a plurality of candidate genomes, each genome comprising a plurality of genes, each gene associated with a respective feature of the agent predictive model; determine a fit of each candidate genome of the plurality of candidate genomes to the agent strategy; and select a candidate genome from the plurality of candidate genomes as the agent genome based on the fit of the candidate genome; for each epoch of a plurality of epochs: for each agent of the plurality of agents: perform a plurality of training iterations based on the agent predictive model and the agent genome; and determine a fitness of the agent predictive model after the plurality of training iterations; determine a first subset of agents with a highest fitness; for each agent of the first subset of agents: generate at least one new agent to add to the plurality of agents; and merge a genome of the at least one new agent with the agent genome of at least one agent of the first subset of agents.

Clause 20: The computer program product of clause 19, wherein the one or more instructions, when executed by the at least one processor, further cause the at least one processor to load a master template comprising a number of agents of the plurality of agents.

Clause 21: The computer program product of clauses 19 or 20, wherein the master template further comprises a plurality of agent templates, wherein selecting the type of predictive model comprises selecting the type of predictive model based on a subset of the plurality of types of predictive models associated with a respective agent template of the plurality of agent templates for each agent.

Clause 22: The computer program product of any one of clauses 19-21, wherein each agent template of the plurality of agent templates further comprises at least one predictive model template, wherein selecting the type of predictive model comprises selecting one of the at least one predictive model template based on the respective agent template for each agent.

Clause 23: The computer program product of any one of clauses 19-22, wherein the master template further comprises goal data associated with at least one condition, and wherein the one or more instructions, when executed by the at least one processor, further cause the at least one processor to: for each epoch of the plurality of epochs: determine whether the at least one agent predictive model of the plurality of agents satisfies the at least one condition associated with the goal data; and terminate the plurality of epochs based on determining the at least one agent predictive model of the plurality of agents satisfies the at least one condition associated with the goal data.

Clause 24: The computer program product of any one of clauses 19-23, wherein the one or more instructions, when executed by the at least one processor, further cause the at least one processor to, for each epoch of the plurality of epochs: determine a second subset of agents with a lowest fitness.

Clause 25: The computer program product of any one of clauses 19-24, wherein the one or more instructions, when executed by the at least one processor, further cause the at least one processor to, for each epoch of the plurality of epochs: filter the at least one new agent based on the second subset of agents.

Clause 26: The computer program product of any one of clauses 19-25, wherein generating the at least one new agent comprises generating at least three new agents.

Clause 27: The computer program product of any one of clauses 19-26, wherein generating the at least one new agent comprises generating at least three new agents comprising a first new agent, a second new agent, and a third new agent, and wherein merging the genome of the at least one new agent with the agent genome of at least one agent of the first subset of agents comprises: merging the genome of the first new agent with the agent genome of a first agent of the first subset of agents having a most different strategy; merging the genome of the second new agent with the agent genome of a second agent of the first subset of agents having a highest fitness; and merging the genome of the third new agent with the agent genome of a third agent of the first subset of agents having a most similar winning strategy.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DETAILED DESCRIPTION

Figure 1:
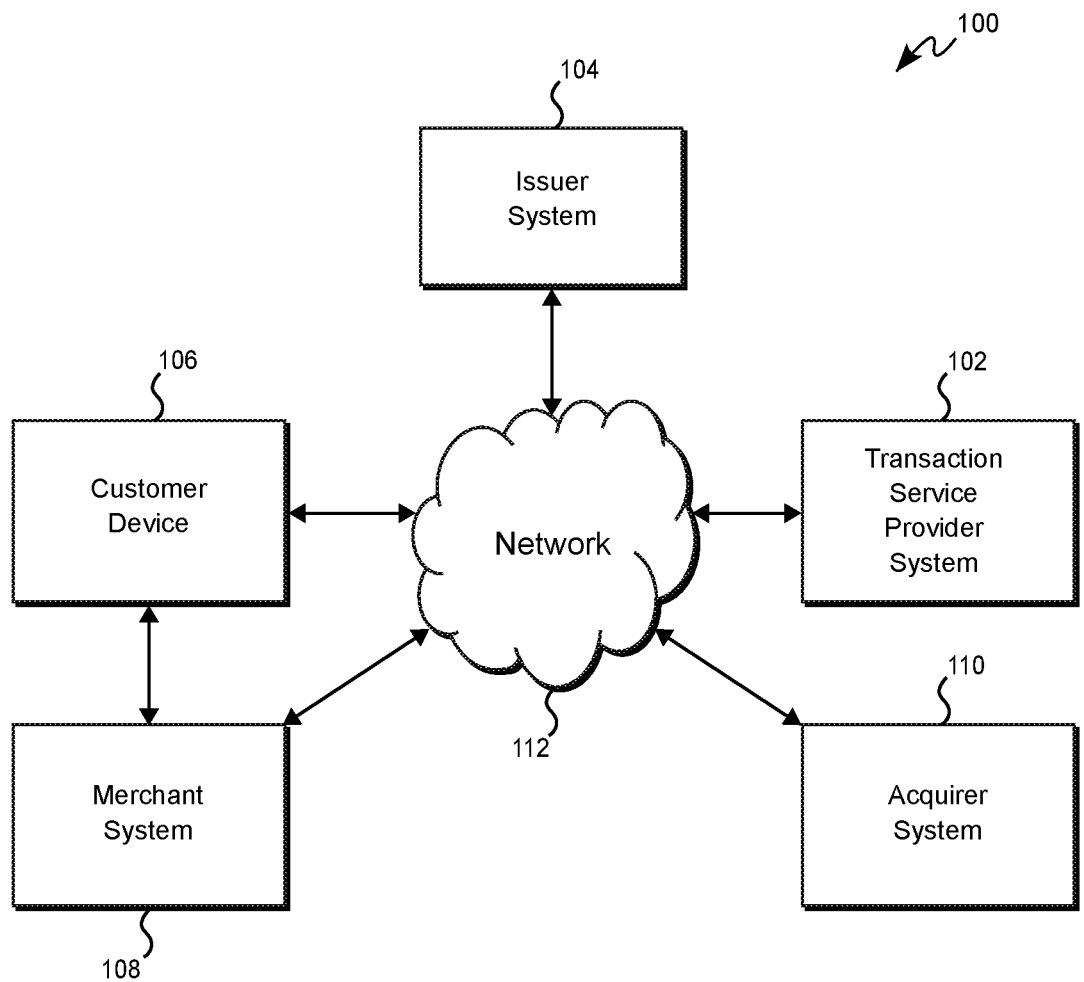
FIG. 1 is a diagram of some non-limiting embodiments or aspects of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token life-cycle management related processes, and/or any other token related processes. In some non-limiting embodiments or aspects, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for controlling genetic learning for predictive models, including, but not limited to, controlling genetic learning for predictive models using predefined strategies. For example, non-limiting embodiments or aspects of the disclosed subject matter provide using predefined strategies to select candidate genomes associated with predictive models for agents and controlling merging of genomes for successive epochs of training the predictive models associated with the agents based on fitness/performance of the predictive models and/or the associated strategies. Such non-limiting embodiments or aspects provide techniques and systems that can operate substantially autonomously (e.g., with reduced or no human interactions). For example, rather than relying on human interactions to design, build, and/or generate predictive models, multiple predictive models may be automatically selected (e.g., based on agent templates) for multiple agents, and features of the models may be automatically selected based on genomes matching selecting strategies (e.g., from a database of predefined strategies). Additionally or alternatively, rather than relying on human interaction to design, set up, and/or operate systems, such systems may automatically be initialized (e.g., based on a master template). Additionally or alternatively, rather than rely on human interaction to define a problem to be solved and/or interpret the output of the predictive models, fitness/performance of the predictive models of the multiple agents may be evaluated based on predefined goal data (e.g., a goal template). Additionally or alternatively, such embodiments provide techniques and systems that can respond to unfamiliar inputs (e.g., external stimuli and/or the like) because multiple agents can be trained to explore responses to such inputs and/or deliver the output with the highest fitness (e.g., deliver a relatively accurate/novel response to relatively unfamiliar/novel input). Additionally or alternatively, such non-limiting embodiments or aspects provide techniques and systems that create a new type of autonomously derived predictive model (e.g., Machine Learning model (ML model), Artificial Intelligence model (AI model), and/or the like) that may be focused on automated input (e.g., external event and/or the like) response and/or use a genetic/evolutionary learning system to drive novel solutions to unfamiliar (e.g., never before seen, not previously evaluated, and/or the like) inputs (e.g., events and/or the like).

For the purpose of illustration, in the following description, while the presently disclosed subject matter is described with respect to methods, systems, and computer program products for controlling genetic learning for predictive models, e.g., using predefined strategies, one skilled in the art will recognize that the disclosed subject matter is not limited to the illustrative embodiments. For example, the methods, systems, and computer program products described herein may be used with a wide variety of settings, such as controlling genetic learning for predictive models in any setting suitable for using such predictive models, e.g., response to media, disaster response, zero-day exploit response, public event response, unfamiliar (e.g., novel and/or the like) data input, client model creation, model rebuilding, hypothesis generation (e.g., novel insights and/or the like), client model customization, and/or the like.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
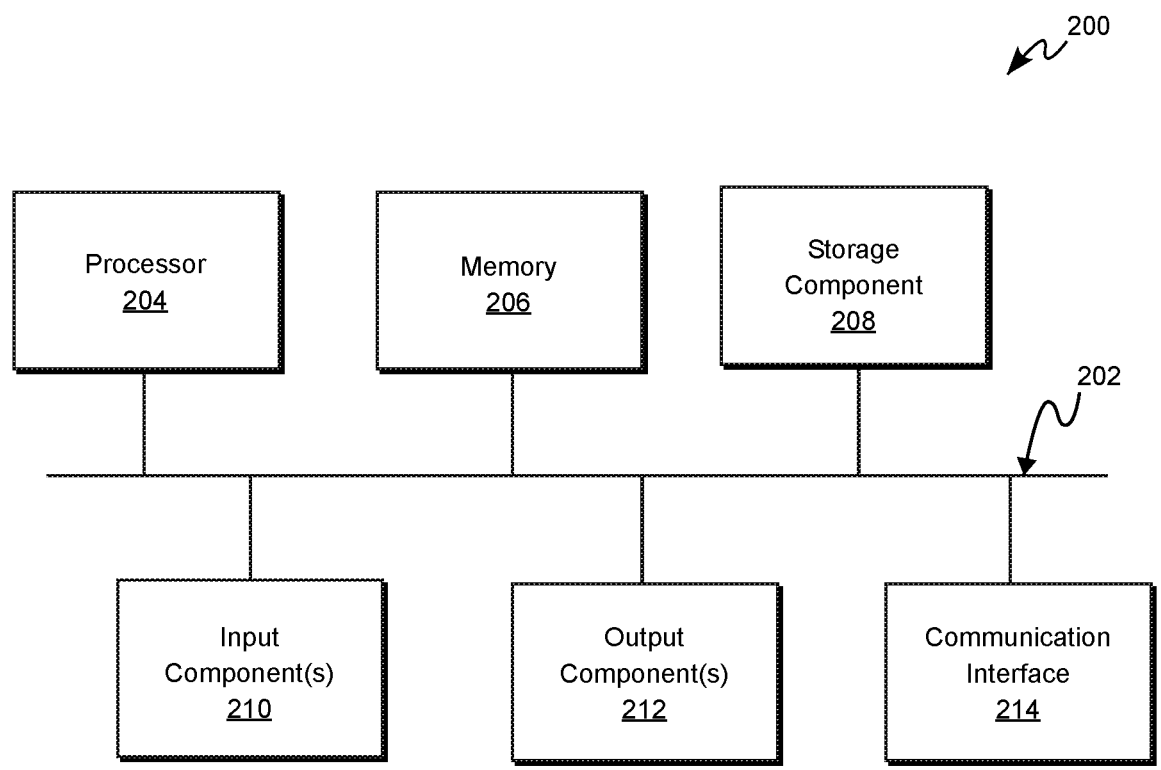
FIG. 2 is a diagram of some non-limiting embodiments or aspects of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, or a combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
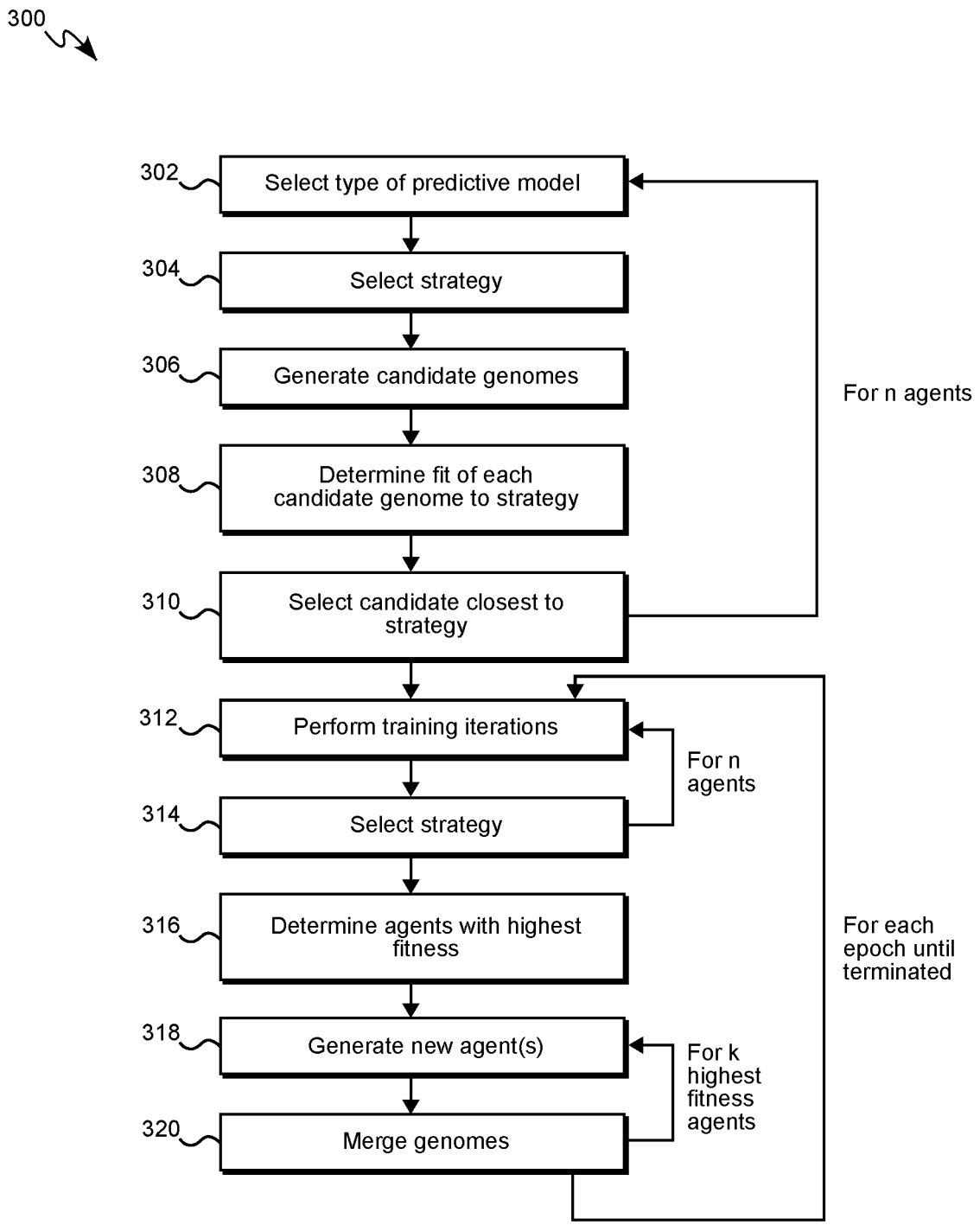
FIG. 3 is a flowchart of some non-limiting embodiments or aspects of a process for controlling genetic learning for predictive models according to the principles of the presently disclosed subject matter.

Referring now to FIG. 3, FIG. 3 is a flowchart of a non-limiting embodiment of a process 300 for controlling genetic learning for predictive models. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, an agent may be a process and/or programmed actor, a process, and/or the like that performs tasks with predictive models, as further described below.

As shown in FIG. 3, at step 302, process 300 may include selecting a type of predictive model for each agent of a plurality of agents. For example, a type of predictive model may be selected (e.g., by transaction service provider system 102, another system, another device, and/or the like) for each agent from a plurality of types of predictive models. In some non-limiting embodiments or aspects, the type of predictive model selected for each respective agent may be the agent predictive model for the respective agent.

In some non-limiting embodiments or aspects, the type of predictive model for each agent may be selected based on one or more templates. In some non-limiting embodiments or aspects, templates may include behavior trees. Additionally or alternatively, each template (and/or behavior tree) may include a set of rules, fields, parameters, variables, settings, and/or the like defining how a process (e.g., process 300 and/or the like) or portions thereof will be performed.

In some non-limiting embodiments or aspects, each agent may be associated with an agent template. In some non-limiting embodiments or aspects, the agent template may include an agent behavior tree, which may include a set of rules, fields, parameters, variables, settings, and/or the like defining how the respective agent will behave (e.g., within a process, such as process 300 and/or the like). In some non-limiting embodiments or aspects, at least one of the agent templates may be associated with a single type of predictive model. Additionally or alternatively, at least one of the agent templates may be associated with a subset of the plurality of types of predictive models. For example, the type of predictive model for each respective agent may be selected based on a subset of the plurality of types of predictive models associated with the respective agent template for the respective agent. In some non-limiting embodiments or aspects, selecting the type of predictive model for the respective agent based on the subset of the plurality of types of predictive models associated with the respective agent template may include selecting one type of predictive model from the subset of the plurality of types of predictive models based on at least one rule included in with the respective agent template. For example, the at least one rule may include randomly selecting one type of predictive model from the subset of the plurality of types of predictive models.

In some non-limiting embodiments or aspects, each agent template of the plurality of agent templates may include at least one predictive model template. For example, selecting the type of predictive model may include selecting one of the predictive model template(s) based on at least one rule included with the respective agent template for each agent. For example, the at least one rule may include randomly selecting one of the predictive model template(s).

In some non-limiting embodiments or aspects, each predictive model template may include a set of rules, fields, parameters, variables, settings, and/or the like defining how the predictive model will behave (e.g., with respect to the agent). For example, each predictive model template may include at least one input, such as a data set, a target (e.g., output to calculate based on the input data), and/or the like. Additionally or alternatively, each predictive model template may include at least one feature, e.g., a set of features and/or the like. In some non-limiting embodiments or aspects, the features may be configurable, e.g., features may be used/turned on, not used/turned off, and/or the like.

In some non-limiting embodiments or aspects, each predictive model template may be associated with at least one predictive model, such as a machine learning model, a supervised learning model, an unsupervised learning model, an artificial intelligence model, and/or the like. For example, each predictive model template may be associated with at least one supervised learning model, including an adaptive boosting (AdaBoost) tree model, a boosted tree model, a random forest model, a decision tree model, a gradient boosted tree model, a backward propagation neural network model, a feed forward neural network model, a recurrent network model, a convolutional neural network model, a deep neural network model, a multinominal neural network model, a liner regression model, a logistic model, a lasso model, a prims model, and/or the like. Additionally or alternatively, each predictive model template may be associated with at least one unsupervised learning model, including a fastgreedy model, a spinglass model, a k-core model, a walktrap model, an edge betweenness model, an infomap model, a label propagation model, an optimal modularity model, a multilevel model, a leading eigenvector model, an intelligent portrait composition assistance (IPCA) model, an antcolony model, a spanning tree model, a k-means clustering model, a restricted boltzmann machine model, and/or the like.

In some non-limiting embodiments or aspects, a master template may be loaded (e.g., by transaction service provider system 102, another system, another device, and/or the like).

In some non-limiting embodiments or aspects, the master template may include a master behavior tree, which may include a set of rules, fields, parameters, variables, settings, and/or the like defining how a process (e.g., process 300 and/or the like) or portions thereof will be performed. For example, the master template may include a number of agents (e.g., a field, parameter, variable, and/or the like indicating a number of agents). Additionally or alternatively, the master template may include the plurality of agent templates. In some non-limiting embodiments or aspects, a number of agent templates may be loaded (e.g., by transaction service provider system 102, another system, another device, and/or the like) based on the number of agents associated with the master template. For example, a number of agent templates based on the number of agents may include selecting the number of agent templates to load from a plurality of agent templates to load based on at least one rule included in with the master template. For example, the at least one rule may include randomly selecting the number of agent templates to load from a plurality of agent templates to load.

In some non-limiting embodiments or aspects, goal data may be loaded (e.g., by transaction service provider system 102, another system, another device, and/or the like). For example, the goal data may include a goal template. In some non-limiting embodiments or aspects, the goal template may include a goal tree, which may include a set of rules, fields, parameters, variables, settings, conditions, success factors, time constraints, and/or the like defining exit criteria for a process (e.g., process 300 and/or the like) or a portion thereof. Additionally or alternatively, the goal data may be included with the master template. In some non-limiting embodiments or aspects, the goal data may be associated with at least one condition, at least one success factor, at least one time constraint, and/or the like. In some non-limiting embodiments or aspects, the time constraint(s) may include a maximum number of epochs to run before termination (e.g., if the other condition(s), success factor(s), and/or the like are not met, the process 300 may automatically terminate after the maximum number of epochs).

As shown in FIG. 3, at step 304, process 300 may include selecting a strategy for each agent. For example, a strategy may be selected (e.g., by transaction service provider system 102, another system, another device, and/or the like) from a plurality of predefined strategies. In some non-limiting embodiments or aspects, the strategy selected for a respective agent may be an agent strategy for the respective agent.

In some non-limiting embodiments or aspects, the strategy for each respective agent may be selected randomly from a uniform distribution of the plurality of predefined strategies. Additionally or alternatively, the strategy for each respective agent may be selected based on at least one rule included in with the respective agent template, the master template, and/or the like. For example, the at least one rule may include randomly selecting one strategy from the plurality of predefined strategies.

In some non-limiting embodiments or aspects, each predefined strategy may include rules, fields, parameters, variables, settings, criteria, and/or the like defining how to determine whether a genome represents the respective predefined strategy (e.g., philosophy, concept, approach, design, procedure, and/or the like). For example, each predefined strategy may include rules, fields, parameters, variables, settings, criteria, and/or the like for determining a fit (e.g., score, value, and/or the like) of a genome to the respective predefined strategy. In some non-limiting embodiments or aspects, each predefined strategy may be at least one of mimicry (e.g., focusing on problems/features that are the most similar), Occam's razor (e.g., focusing on the simplest form, such as least features turned on/used), priming (e.g., reviewing a list of models that perform well), progressive disclosure (e.g., slowly/incrementally adding/turning on features), proximity (e.g., focusing on features close to the target), redundancy (e.g., focusing on many features across a broad spectrum), satisficing (e.g., seeking a satisficing/satisfactory requirement), forgiveness (e.g., expecting dominant features to drift/change), area alignment (e.g., aligning average components), extreme alignment (e.g., aligning to high signal components), novelty, and/or the like.

In some non-limiting embodiments or aspects, each predefined strategy may be represented as executable code, pseudocode, and/or the like. For example, Occam's razor may be represented in pseudocode as follows:

```
def occamsrazor(gene):
    f_len = float(len(gene))
    i_tot = sum(gene)
    return 1 - i_tot / f_len
```

For the purpose of illustration and not limitation, "gene" may be the genome (e.g., candidate genome, agent genome, and/or the like) that is input into the predefined strategy function, "len(gene)" may return the length of the genome (and "float" may convert such value into a floating point number, e.g., from an integer number), "sum(gene)" may return the sum of the bits of the genome, and the value returned (e.g., based on the expression after "return") may be the score indicating how well the genome represents the predefined strategy function. In some non-limiting embodiments or aspects, for Occam's razor, the value returned may be higher given a lower number of active/used/turned on bits.

For example, redundancy may be represented in pseudocode as follows:

```
def redundancy(gene):
    f_len = float(len(gene))
    i_tot = sum(gene)
    return i_tot / f_len
```

For the purpose of illustration and not limitation, the variable names and functions may be the same as or similar to as described above. In some non-limiting embodiments or aspects, for redundancy, the value returned may be higher given a higher number of active/used/turned on bits.

For example, mimicry may be represented in pseudocode as follows:

```
def mimicry(gene , eviron):
    f_len = float(len(gene))
    scr = [f_len]
    if len(eviron.shared_suc_traits) > 0:
        scr = [1.0 for i_pos, val in enumerate(gene) if val ==
    eviron.shared_suc_traits[-1][i_pos]]
    return sum(scr) / f_len
```

For the purpose of illustration and not limitation, the variable "environ" may be associated with the environment; the variable "scr" may be associated with the number of traits that are expressed in a global list of successful traits; "eviron.shared_suc_traits" may be associated with successful traits of agent(s), agent predictive model(s), agent genome(s), and/or the like within the environment; "enumerate (gene)" may return the genes of the genome. Additionally or alternatively, inclusion of brackets (e.g., "[ ]") around a variable may indicate declaring the variable as a list before the line of code is executed. Additionally or alternatively, the other variable names and functions may be the same as or similar to as described above. In some non-limiting embodiments or aspects, for mimicry, the value returned may be higher for genomes that use successful features. In some non-limiting embodiments or aspects, a successful feature may include a feature that is shared (e.g., used, turned on, and/or corresponding bit of a genome bit string equal to 1) among top performing genomes (e.g., a subset of genomes with a highest fitness, as further described below). For example, the successful feature may be in all such genomes in the subset, in greater than a predetermined proportion of such genomes in the subset, and/or the like. Additionally or alternatively, at initialization, features may be considered and/or determined to be successful based on data available from a prior run, or, if data from a prior run is unavailable, each genome and/or gene may begin with a same fitness.

For example, extreme alignment may be represented in pseudocode as follows:

```
def extreme(gene , eviron):
    f_len = float(len(gene))
    scr = [f_len]
    if len(eviron.shared_suc_traits) > f_len *.25:
        scr = [1.0 for i_pos, val in enumerate(gene) if val ==
eviron.shared_suc_traits[-1][i_pos]]
    return 1 - sum(scr) / f_len
```

For the purpose of illustration and not limitation, the variable names and functions may be the same as or similar to as described above. In some non-limiting embodiments or aspects, for extreme alignment, the value returned may be higher for genomes that use fewer successful features.

For example, priming may be represented in pseudocode as follows:

```
def priming(gene , eviron):
    f_len = float(len(gene))
    scr = [0]
    if len(eviron.prior_model) > 0:
        scr = [1.0 for i_pos, val in enumerate(gene) if val ==
eviron.prior_mode[i_pos]]
    return sum(scr) / f_len
```

For the purpose of illustration and not limitation, the variable "eviron.prior_model" may be associated with models loaded from prior runs or epochs. Additionally or alternatively, the other variable names and functions may be the same as or similar to as described above. In some non-limiting embodiments or aspects, for priming, the value returned may be higher for genomes that match previous genomes more closely. In some non-limiting embodiments or aspects, at initialization, a previous genome may be based on data from a prior run, or, if no data from a prior run is available, the previous genomes may be an empty set.

For example, novelty may be represented in pseudocode as follows:

```
def novelty(gene , eviron):
    f_len = float(len(gene))
    scr = [0]
```

-continued

```
    if len(eviron.prior_model) > 0:
        scr = [1.0 for i_pos, val in enumerate(gene) if val ==
eviron.prior_mode[i_pos]]
    return 1 - sum(scr) / f_len
```

For the purpose of illustration and not limitation, the variable names and functions may be the same as or similar to as described above. In some non-limiting embodiments or aspects, for novelty, the value returned may be higher for genomes that differ more from previous genomes.

As shown in FIG. 3, at step 306, process 300 may include generating candidate genomes. For example, a plurality of candidate genomes may be generated (e.g., by transaction service provider system 102, another system, another device, and/or the like) for each agent. In some non-limiting embodiments or aspects, each candidate genome may include a plurality of genes. Additionally or alternatively, each gene may be associated with a respective feature of the agent predictive model (e.g., the predictive model selected for the respective agent). In some non-limiting embodiments or aspects, generating each candidate genome of the plurality of candidate genomes may include randomly generating each gene for the respective candidate genome.

In some non-limiting embodiments or aspects, each genome may be a bit string, in which each bit in the string is associated with a respective feature of the predictive model (e.g., from the set of features in the predictive model template). For the purpose of illustration and not limitation, if a predictive model includes four features, each candidate genome may include a four-bit string, e.g., 1010; if a predictive model includes six features, each candidate genome may include a six-bit string, e.g., 010010; and/or the like. For example, a set of six features for a predictive model for detecting a network intrusion may include duration (e.g., length of time in seconds), protocol type (e.g., tcp, udp, and/or the like), source bytes (e.g., number of data bytes from source to destination), destination bytes (e.g., number of data bytes from destination to source), whether the connection was successfully logged in, and whether a "su root" command was attempted. In such an example, a candidate genome of 010010 may mean only the second and fourth features in such a set are used/turned on; a candidate genome of 110001 may mean only the first, second, and sixth features are used/turned on; and/or the like.

In some non-limiting embodiments or aspects, the number of candidate genomes generated for each agent may be based on at least one of the master template, the respective agent template, and/or the like.

As shown in FIG. 3, at step 308, process 300 may include determining a fit for each candidate genome. For example, a fit of each candidate genome of the plurality of candidate genomes to the agent strategy (e.g., the predefined strategy selected for the respective agent) may be determined (e.g., by transaction service provider system 102, another system, another device, and/or the like). In some non-limiting embodiments or aspects, the fit for each respective candidate genome may be the score, value, and/or the like returned by the predefined strategy for the respective candidate genome, as described herein.

As shown in FIG. 3, at step 310, process 300 may include selecting the candidate genome that most closely fits to the agent strategy. For example, a candidate genome may be selected (e.g., by transaction service provider system 102, another system, another device, and/or the like) from the plurality of candidate genomes as the agent genome based on the fit of the candidate genome. In some non-limiting embodiments or aspects, the candidate genome with a greatest fit (e.g., score, value, and/or the like returned by the predefined strategy) may be selected as the agent genome.

As shown in FIG. 3, at step 312, process 300 may include performing (e.g., run and/or the like) training iterations for each agent. For example, in each epoch of a plurality of epochs, a plurality of training iterations may be performed (e.g., by transaction service provider system 102, another system, another device, and/or the like) based on the agent predictive model and the agent genome for each agent. In some non-limiting embodiments or aspects, the agent genome and the agent predictive model may be used to populate the agent template. Additionally or alternatively, training iterations may be performed based on the agent template (e.g., rules, fields, parameters, variables, settings, and/or the like defining how to perform training iterations, e.g., based on the agent predictive model and agent genome). For example, running the agent template may include executing the agent predictive model of the respective template.

As shown in FIG. 3, at step 314, process 300 may include determining a fitness of each agent (e.g., each agent predictive model after training). For example, a fitness of the agent predictive model of each agent may be determined after the plurality of training iterations (e.g., by transaction service provider system 102, another system, another device, and/or the like). In some non-limiting embodiments or aspects, determining the fitness of each agent predictive model may include performing a numeric calculation (e.g., calculating a fitness score, a sum of squared errors, a mean of squared errors, a sum of errors, a mean of errors, and/or the like). Additionally or alternatively, a target value may be subtracted from the fitness. Additionally or alternatively, the fitness may be modified based on the agent strategy, e.g., weighting the calculation based on the agent strategy.

As shown in FIG. 3, at step 316, process 300 may include determining the agents with a highest fitness. For example, a first subset of agents with a highest fitness may be determined (e.g., by transaction service provider system 102, another system, another device, and/or the like). For example, the agents may be searched to identify a number of agents with the highest fitness to include in the first subset. Additionally or alternatively, the agents may be sorted based on the fitness of each agent, and the agents with the highest fitness may be identified to include in the first subset.

In some non-limiting embodiments or aspects, the agents may be separated into multiple subsets, e.g., the first subset of agents with a highest fitness, as described above, and a second subset of agents with a lowest fitness. For example, the second subset of agents with a lowest fitness may be determined (e.g., by transaction service provider system 102, another system, another device, and/or the like).

In some non-limiting embodiments or aspects, the number of agents in the first subset and/or the number of agents in the second subset may be based on the master template.

In some non-limiting embodiments or aspects, a determination may be made (e.g. by transaction service provider system 102, another system, another device, and/or the like) whether at least one agent (e.g., at least one agent predictive model of at least one agent) satisfies the condition(s), success factor(s), and/or the like associated with the goal data. In some non-limiting embodiments or aspects, when the goal data is included in a goal template, whether at least one agent satisfies the goal template may be determined. In some non-limiting embodiments or aspects, if at least one agent satisfies the goal data/goal template, the epochs may be terminated.

As shown in FIG. 3, at step 318, process 300 may include generating at least one new agent. For example, at least one new agent may be generated (e.g., by transaction service provider system 102, another system, another device, and/or the like) based on each agent in the first subset of agents (e.g., the current agents with the highest fitness) to add to the plurality of agents. In some non-limiting embodiments or aspects, a number of new agents generated for each agent in the first subset may be based on the master template.

In some non-limiting embodiments or aspects, the number of new agents to be generated for each agent in the first subset may be three (e.g., based on the master template). For example, generating the new agent(s) may include generating (e.g., by transaction service provider system 102, another system, another device, and/or the like) at least three new agents for each agent in the first subset. In some non-limiting embodiments or aspects, the at least three new agents may include a first new agent, a second new agent, and a third new agent.

In some non-limiting embodiments or aspects, metadata may be determined for each agent (e.g., agents in the first subset, new agents, and/or the like). For example, metadata (e.g., the agent strategy, whether the agent ran in the current and/or previous epoch(s), results of running the agent template, data regarding prior runs of the agent template, evaluations of the agent/agent template/agent predictive model, data used by the agent/agent template/agent predictive model, genes/genomes of the agent, resources used to run the agent template/agent predictive model, and/or the like) may be determined (e.g., by transaction service provider system 102, another system, another device, and/or the like).

As shown in FIG. 3, at step 320, process 300 may include merging genomes. For example, a genome of each new agent may be merged (e.g., by transaction service provider system 102, another system, another device, and/or the like) with the agent genome of at least one agent of the first subset of agents. In some non-limiting embodiments or aspects, assuming three new agents were generated for each agent in the first subset, the genome of the first new agent may be merged with the genome of a first agent of the first subset of agents having a most different strategy. Additionally or alternatively, the genome of the second new agent may be merged with the genome of a second agent of the first subset of agents having a highest fitness. Additionally or alternatively, the genome of the third new agent may be merged with the genome of a third agent of the first subset of agents having a most similar winning strategy. In some non-limiting embodiments or aspects, similarity between two given genomes (e.g., genome A such as a genome from one of the new agents and genome B such as a genome from one of the agents in the first subset) may be determined based on a vector distance score. For example, a vector distance score may be expressed as follows:

$$\text{similarity} = \text{overlapping bits/number of bits}$$

In some non-limiting embodiments or aspects, merging two genomes (e.g., genome A such as a genome from one of the new agents and genome B such as a genome from one of the agents in the first subset) may include combining and/or mating the two genomes. For example, for each gene (e.g., respective bit in the respective bit strings of genomes A and B), a random number from a uniform distribution (e.g., between 0 and 1) may be generated. Additionally or alternatively, if the random number is equal to or closer to 1 (e.g., greater than 0.5), the gene (e.g., respective bit) from genome A may be used in the resulting merged genome. Additionally or alternatively, if the random number is equal to or closer to 0 (e.g., less than 0.5), the gene (e.g., respective bit) from genome B may be used in the resulting merged genome. For the purpose of illustration and not limitation, Genome A may be a bit string such as 010010 and Genome B may be a bit string such as 110001. Additionally or alternatively, the procedure for merging the genomes may be expressed in pseudocode as follows:

```
For pos in range(6):
    if Random.float( ) > .5:
        New_Genome.append(GenomeA[pos])
    else:
        New_Genome.append(GenomeB[pos])
```

In the above example, "pos" may refer to the current position (e.g., which gene/bit in the respective bit strings) is currently being merged, "Random.float( )" may return a random number between 0 and 1, "New_Genome.append (Genome1[pos])" may use the gene from Genome A if the condition is satisfied (e.g., the random number is greater than 0.5) for the resulting merged genome, and otherwise "New_Genome.append(GenomeB[pos])" may use the gene from Genome B (e.g., when the random number is less than or equal to 0.5) for the resulting merged genome.

In some non-limiting embodiments or aspects, at least some agents (e.g., new agents, agents in the second subset, and/or the like) may be filtered (e.g., removed from the plurality of agents) based on the second subset of agents. For example, at least one new agent may be filtered (e.g., by transaction service provider system 102, another system, another device, and/or the like) based on the second subset of agents. In some non-limiting embodiments or aspects, the second subset of agents may be added to an immunity database (e.g., a set of agents with low fitness/poor performance). Additionally or alternatively, filtering the agent(s) (e.g., at least one new agent) may be based on determining similarity, as described herein, of such agents to agents in the immunity database, and/or based on such agents matching genome from the immunity database, having the same or similar predefined strategy as certain agents in the immunity database, and/or the like.

In some non-limiting embodiments or aspects, after the merging and/or filtering, a new epoch may be run (e.g., repeating steps 312-320 using the current agents). In some non-limiting embodiments or aspects, successive epochs may continue to be run until the process (e.g., process 300) is terminated, e.g., based on goal data, time constraints, and/or the like.

Figure 4:
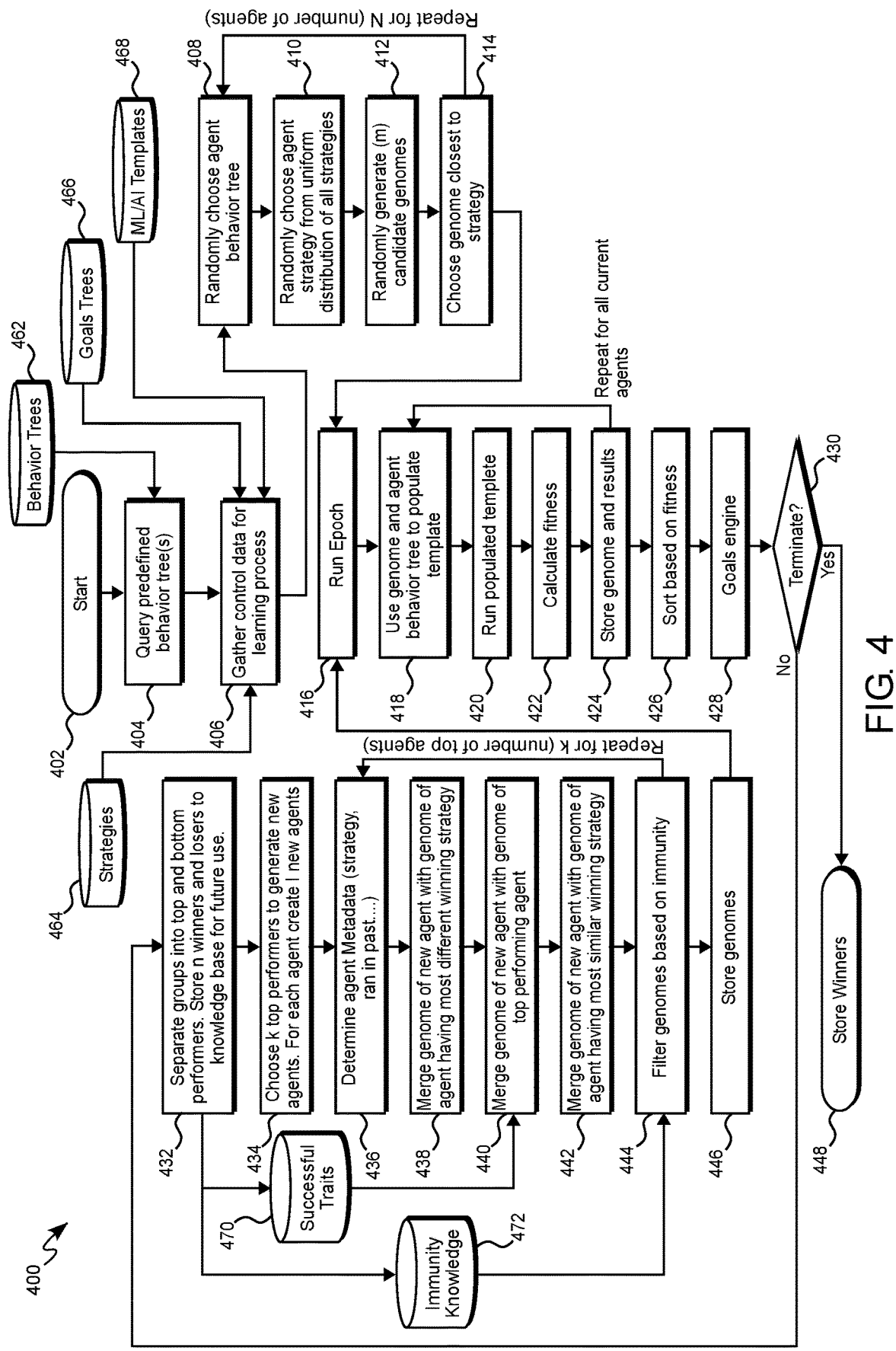
FIG. 4 is a diagram of some non-limiting embodiments or aspects of an implementation of the non-limiting embodiment or aspect of the process shown in FIG. 3 according to the principles of the presently disclosed subject matter.

Referring now to FIG. 4, FIG. 4 is a diagram of an exemplary implementation 400 of a non-limiting embodiment relating to process 300 shown in FIG. 3. As shown in FIG. 4, implementation 400 may include behavior trees database 462 (e.g., a database including master template(s), agent template(s), and/or the like), strategies database 464 (e.g., a database of predefined strategies and/or the like), goals tree database 466 (e.g., a database of goal data and/or the like), ML/AI templates database 468 (e.g., a database of predictive model template(s) and/or the like), successful traits database 470 (e.g., a database of agents and/or genomes associated with a highest fitness and/or the like), and immunity knowledge database 472 (e.g., a database of agents and/or genomes associated with a lowest fitness and/or the like). In some non-limiting embodiments or aspects, two or more of the behavior trees database 462, strategies database 464, goals tree database 466, ML/AI templates database 468, successful traits database 470, and immunity knowledge database 472 may be the same database. In some non-limiting embodiments or aspects, one or more of the behavior trees database 462, strategies database 464, goals tree database 466, ML/AI templates database 468, successful traits database 470, and immunity knowledge database 472 may be part of or similar to transaction service provider system 102 (e.g., one or more devices of transaction service provider system 102). In some non-limiting embodiments or aspects, one or more of the behavior trees database 462, strategies database 464, goals tree database 466, ML/AI templates database 468, successful traits database 470, and immunity knowledge database 472 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, one or more of the steps of implementation 400 may be performed (e.g., completely, partially, and/or the like) by transaction service provider system 102 (e.g., one or more devices of transaction service provider system 102). In some non-limiting embodiments or aspects, one or more of the steps of implementation 400 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, the steps of implementation 400 may be the same as or similar to the steps of process 300.

As shown in FIG. 4, at step 402, implementation 400 may start. As shown in FIG. 4, at step 404, implementation 400 may include querying (e.g., loading) predefined behavior trees (e.g., master template(s), agent template(s), and/or the like), as described herein. For example, the behavior trees may be queried (e.g., by transaction service provider system 102, another system, another device, and/or the like) from behavior trees database 462 and/or the like.

As shown in FIG. 4, at step 406, implementation 400 may include gathering control data (e.g., loading predefined strategies, goals data, predictive model templates, and/or the like), as described herein. For example, such control data may be gathered/loaded (e.g., by transaction service provider system 102, another system, another device, and/or the like) from strategies database 464, goals tree database 466, ML/AI templates database 468, and/or the like.

As shown in FIG. 4, at step 408, implementation 400 may include selecting agent templates and/or agent predictive models, as described herein. For example, a number of agent templates may be selected (e.g., randomly selected and/or the like) based on the master template (e.g., by transaction service provider system 102, another system, another device, and/or the like). Additionally or alternatively, an agent predictive model may be selected (e.g., by transaction service provider system 102, another system, another device, and/or the like) based on the respective agent template.

As shown in FIG. 4, at step 410, implementation 400 may include selecting an agent strategy for each agent, as described herein. For example, the agent strategy may be selected (e.g., randomly selected and/or the like) from the plurality of predefined strategies (e.g., by transaction service provider system 102, another system, another device, and/or the like) based on the master template and/or respective agent template.

As shown in FIG. 4, at step 412, implementation 400 may include generating candidate genomes (e.g., randomly generating m candidate genomes), as described herein. For example, a number of candidate genomes may be generated (e.g., by transaction service provider system 102, another system, another device, and/or the like) based on the master template and/or respective agent template.

As shown in FIG. 4, at step 414, implementation 400 may include selecting an agent genome (e.g., a candidate genome closest to the respective agent strategy). For example, a fit for each candidate genome may be determined (e.g., by transaction service provider system 102, another system, another device, and/or the like). Additionally or alternatively, a candidate genome may be selected (e.g., by transaction service provider system 102, another system, another device, and/or the like) as the agent genome based on the fit (e.g., best/highest fit).

As shown in FIG. 4, at step 416, implementation 400 may include running one or more epochs (e.g., a plurality of epochs), as described herein. For each epoch, as shown in FIG. 4, at step 418, implementation 400 may include using the respective agent genome and/or respective agent predictive model to populate (e.g., by transaction service provider system 102, another system, another device, and/or the like) the respective agent template, as described herein.

As shown in FIG. 4, at step 420, implementation 400 may include running training iterations based on the respective agent template of each agent, as described herein. For example, a plurality of training iterations may be performed (e.g., by transaction service provider system 102, another system, another device, and/or the like) based on the agent template, agent predictive model, and/or agent genome, as described herein.

As shown in FIG. 4, at step 422, implementation 400 may include calculating the fitness of each agent, as described herein. For example, a fitness for each agent (e.g., the respective agent predictive model of each agent) may be determined (e.g., by transaction service provider system 102, another system, another device, and/or the like) after the training iterations, as described herein.

As shown in FIG. 4, at step 424, implementation 400 may include storing the agent genome and results (e.g., calculated fitness) for each agent, as described herein. For example, each agent and its corresponding data (e.g., agent genome, fitness/results, and/or the like) may be stored (e.g., by transaction service provider system 102, another system, another device, and/or the like).

As shown in FIG. 4, at step 426, implementation 400 may include sorting the agents based on fitness, as described herein. For example, the agents may be sorted (e.g., by transaction service provider system 102, another system, another device, and/or the like) based on fitness.

As shown in FIG. 4, at step 428, implementation 400 may include evaluating the agents based on the goal data, as described herein. For example, whether at least one agent predictive model of the plurality of agents satisfies the condition(s), success factor(s), and/or the like associated with the goal data (e.g., goal template, goal data from master template, and/or the like) may be determined (e.g., by transaction service provider system 102, another system, another device, and/or the like).

As shown in FIG. 4, at step 430, implementation 400 may include determining whether to terminate based on satisfaction of the goal data/goal template, as described herein. For example, if the goal data/goal template is satisfied (and/or if time constraints are reached), the epochs may be terminated (e.g., by transaction service provider system 102, another system, another device, and/or the like).

As shown in FIG. 4, at step 432, implementation 400 may include separating the agents into groups/subsets, as described herein. For example, the agents may be separated (e.g., by transaction service provider system 102, another system, another device, and/or the like) into a first subset of top performers (e.g., agents having a highest fitness) and/or a second subset of bottom performers (e.g., agents having a lowest fitness). In some non-limiting embodiments or aspects, the first subset of agents may be stored in successful traits database 470. Additionally or alternatively, the second subset of agents may be stored in immunity knowledge database 472.

As shown in FIG. 4, at step 434, implementation 400 may include generating at least one new agent for each of the top performers (e.g., agents having a highest fitness) in the first subset, as described herein. For example, at least one new agent may be generated (e.g., by transaction service provider system 102, another system, another device, and/or the like) to add to the plurality of agents.

As shown in FIG. 4, at step 436, implementation 400 may include determining metadata for each agent, as described herein. For example, metadata (e.g., the agent strategy, whether the agent ran in the current and/or previous epoch(s), and/or the like) may be determined (e.g., by transaction service provider system 102, another system, another device, and/or the like) for each agent in the first subset, each new agent, each agent in the second subset, and/or the like.

As shown in FIG. 4, at steps 438-442, implementation 400 may include merging the genome(s) of the new agent(s) with the agent genome(s) of at least one agent of the first subset of agents (e.g., agents with the highest fitness), as described herein. In some non-limiting embodiments or aspects, the first subset of agents may be retrieved from successful traits database 470. In some non-limiting embodiments or aspects, as shown in FIG. 4, at step 438, implementation 400 may include merging (e.g., by transaction service provider system 102, another system, another device, and/or the like) the genome of a first new agent with the genome of a first agent of the first subset of agents having a most different strategy, as described herein. Additionally or alternatively, as shown in FIG. 4, at step 440, implementation 400 may include merging (e.g., by transaction service provider system 102, another system, another device, and/or the like) the genome of the second new agent with the genome of a second agent of the first subset of agents having a highest fitness, as described herein. Additionally or alternatively, as shown in FIG. 4, at step 442, implementation 400 may include merging (e.g., by transaction service provider system 102, another system, another device, and/or the like) the genome of the third new agent with the genome of a third agent of the first subset of agents having a most similar winning strategy, as described herein.

As shown in FIG. 4, at step 444, implementation 400 may include filtering certain agents (e.g., the new agents, agents from the first subset, agents of the second subset, and/or the like) based on genomes of agents in the second subset and/or based on immunity knowledge database 472, as described herein. In some non-limiting embodiments or aspects, the second subset of agents may be retrieved from immunity knowledge database 472. In some non-limiting embodiments or aspects, at least some agents (e.g., new agents, agents in the second subset, and/or the like) may be filtered (e.g., removed from the plurality of agents) based on the second subset of agents, e.g., based on determining similarity of such agents to agents in the immunity database (e.g., by transaction service provider system 102, another system, another device, and/or the like).

As shown in FIG. 4, at step 446, implementation 400 may include storing the current agents/genomes (e.g., after the merging and/or filtering) for use in the next epoch, as described herein.

As shown in FIG. 4, at step 448, implementation 400 may include storing the winner(s) (e.g., top performing agents, agents with a highest fitness, and/or the like) after terminating the epochs, as described herein. For example, after the goal data/goal template is satisfied (and/or if time constraints are reached) and the epochs are terminated, the winner(s) may be stored (e.g., by transaction service provider system 102, another system, another device, and/or the like).

Figure 5:
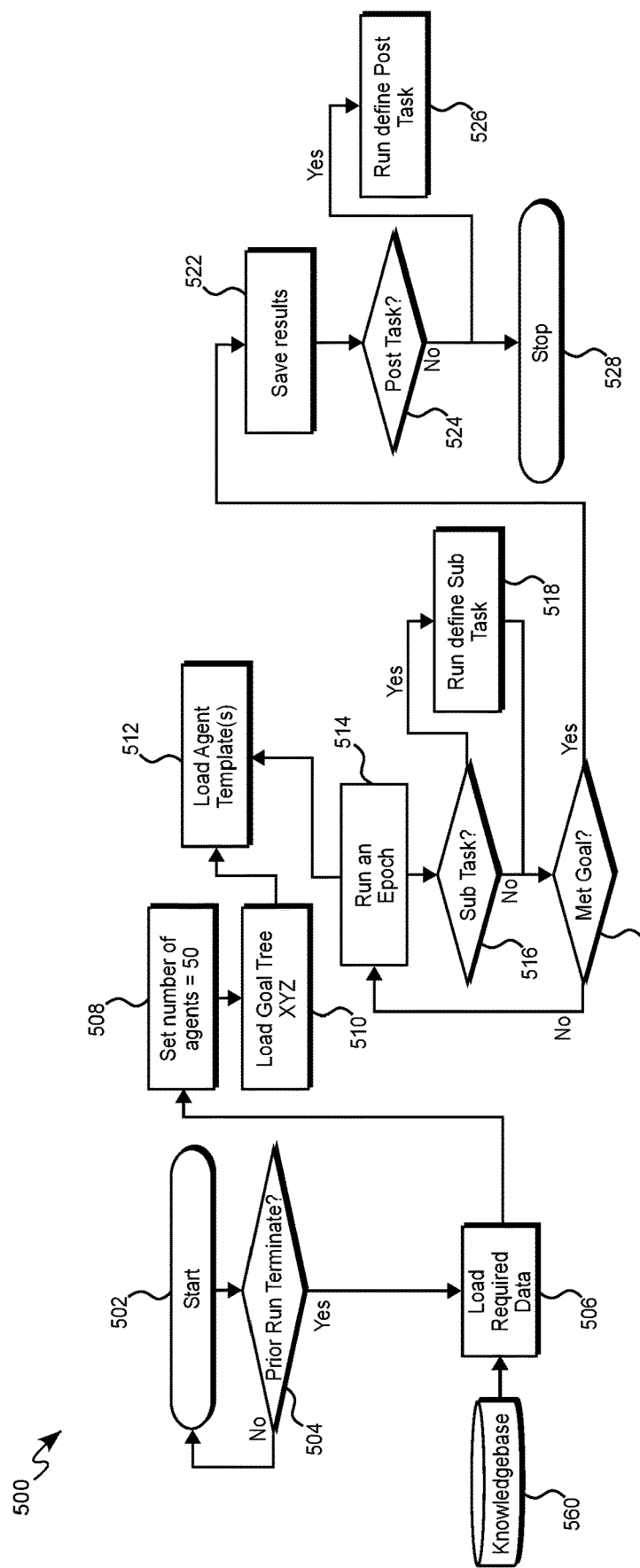
FIG. 5 is a diagram of some non-limiting embodiments or aspects of a master template for use in the implementation of FIG. 4 and/or the process shown in FIG. 3 according to the principles of the presently disclosed subject matter.

Referring now to FIG. 5, FIG. 5 is a diagram of an exemplary master template for use in some non-limiting embodiments relating to the implementation of FIG. 4 and/or the process shown in FIG. 3. As shown in FIG. 5, master template 500 may include and/or use knowledgebase 560. In some non-limiting embodiments or aspects, knowledgebase 560 may be the same as, similar to, and/or include behavior trees database 462, strategies database 464, goals tree database 466, ML/AI templates database 468, successful traits database 470, and/or immunity knowledge database 472. In some non-limiting embodiments or aspects, knowledgebase 560 may be part of or similar to transaction service provider system 102 (e.g., one or more devices of transaction service provider system 102). In some non-limiting embodiments or aspects, knowledgebase 560 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, one or more of the steps of master template 500 may be performed (e.g., completely, partially, and/or the like) by transaction service provider system 102 (e.g., one or more devices of transaction service provider system 102). In some non-limiting embodiments or aspects, one or more of the steps of master template 500 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 5, at step 502, master template 500 may include a starting point. As shown in FIG. 5, at step 504, master template 500 may include determining (e.g., by transaction service provider system 102, another system, another device, and/or the like) whether a prior run has terminated. For example, if a prior run has not yet terminated, master template 500 may wait. Additionally or alternatively, if the prior run has terminated, master template 500 may proceed to the next step(s).

As shown in FIG. 5, at step 506, master template 500 may include loading required data. For example, data (e.g., predefined strategies, goal data, agent templates, and/or the like) may be loaded (e.g., by transaction service provider system 102, another system, another device, and/or the like) from knowledgebase 560.

As shown in FIG. 5, at step 508, master template 500 may include setting/selecting a number of agents, as described herein. For example, a number of agents may be set/selected (e.g., by transaction service provider system 102, another system, another device, and/or the like). In some non-limiting embodiments or aspects, the number of agents may be any suitable number of agents. For example, the number of agents may be any sufficiently large number of agents, such as 50 agents. Additionally or alternatively, a number of agents based on the number of predefined strategies, the number of predictive model templates, the number of permutations and/or combinations of predefined strategies and predictive model templates, and/or the like.

As shown in FIG. 5, at step 510, master template 500 may include loading goal data, as described herein. For example, the goal data (e.g., goal template, goal tree, and/or the like) may be loaded (e.g., by transaction service provider system 102, another system, another device, and/or the like) from knowledgebase 560 and/or the like.

As shown in FIG. 5, at step 512, master template 500 may include loading agent templates, as described herein. For example, the agent templates may be loaded (e.g., by transaction service provider system 102, another system, another device, and/or the like) from knowledgebase 560 and/or the like.

As shown in FIG. 5, at step 514, master template 500 may include steps to be run for each epoch (e.g., training iterations, and/or the like), as described herein. In some non-limiting embodiments or aspects, such steps (e.g., training iterations, determining fitness, and/or the like) may be performed (e.g., by transaction service provider system 102, another system, another device, and/or the like) during each epoch. In some non-limiting embodiments or aspects, as shown in FIG. 5, at step 516, master template 500 may include determining whether there are substeps/subtasks for performance during each epoch (e.g., substeps/subtasks of each training iteration, of determining fitness, and/or the like). For example, whether there are such substeps/subtasks may be determined (e.g., by transaction service provider system 102, another system, another device, and/or the like) during each epoch. In some non-limiting embodiments or aspects, at step 516, master template 500 may include performing/running the substeps/subtasks (e.g., of each training iteration, of determining fitness, and/or the like). For example, such substeps/subtasks may be performed (e.g., by transaction service provider system 102, another system, another device, and/or the like) for each epoch. In some non-limiting embodiments or aspects, as shown in FIG. 5, at step 520, master template 500 may include determining whether goals (e.g., goals of training iterations, goal data of the master template/goal data, and/or the like) are satisfied. For example, whether such goals are satisfied may be determined (e.g., by transaction service provider system 102, another system, another device, and/or the like) for each epoch.

As shown in FIG. 5, at step 522, master template 500 may include saving the results of running the epoch (e.g., saving the predictive model and/or genome of each agent after training iterations, saving the fitness of each agent, and/or the like), as described herein. For example, such results may be saved (e.g., by transaction service provider system 102, another system, another device, and/or the like) for each epoch.

As shown in FIG. 5, at step 524, master template 500 may include determining whether there are additional steps/post tasks for performance after each epoch. For example, whether there are such additional steps/post tasks may be determined (e.g., by transaction service provider system 102, another system, another device, and/or the like) after each epoch. In some non-limiting embodiments or aspects, at step 526, master template 500 may include performing/running the additional steps/post tasks after each epoch. For example, such additional steps/post tasks may be performed (e.g., by transaction service provider system 102, another system, another device, and/or the like) after each epoch. In some non-limiting embodiments or aspects, such additional steps/post tasks may include sorting agents based on fitness, determining whether goal data has been satisfied, separating the agents into subsets/groups, generating at least one new agent based on the top performing agent(s), merging genomes of the new agent(s) and at least one top performing agent(s), filtering agents based on bottom performing agents and/or immunity knowledge, and/or the like, as described herein.

As shown in FIG. 5, at step 528, master template 500 may include a stopping point.

Figure 6:
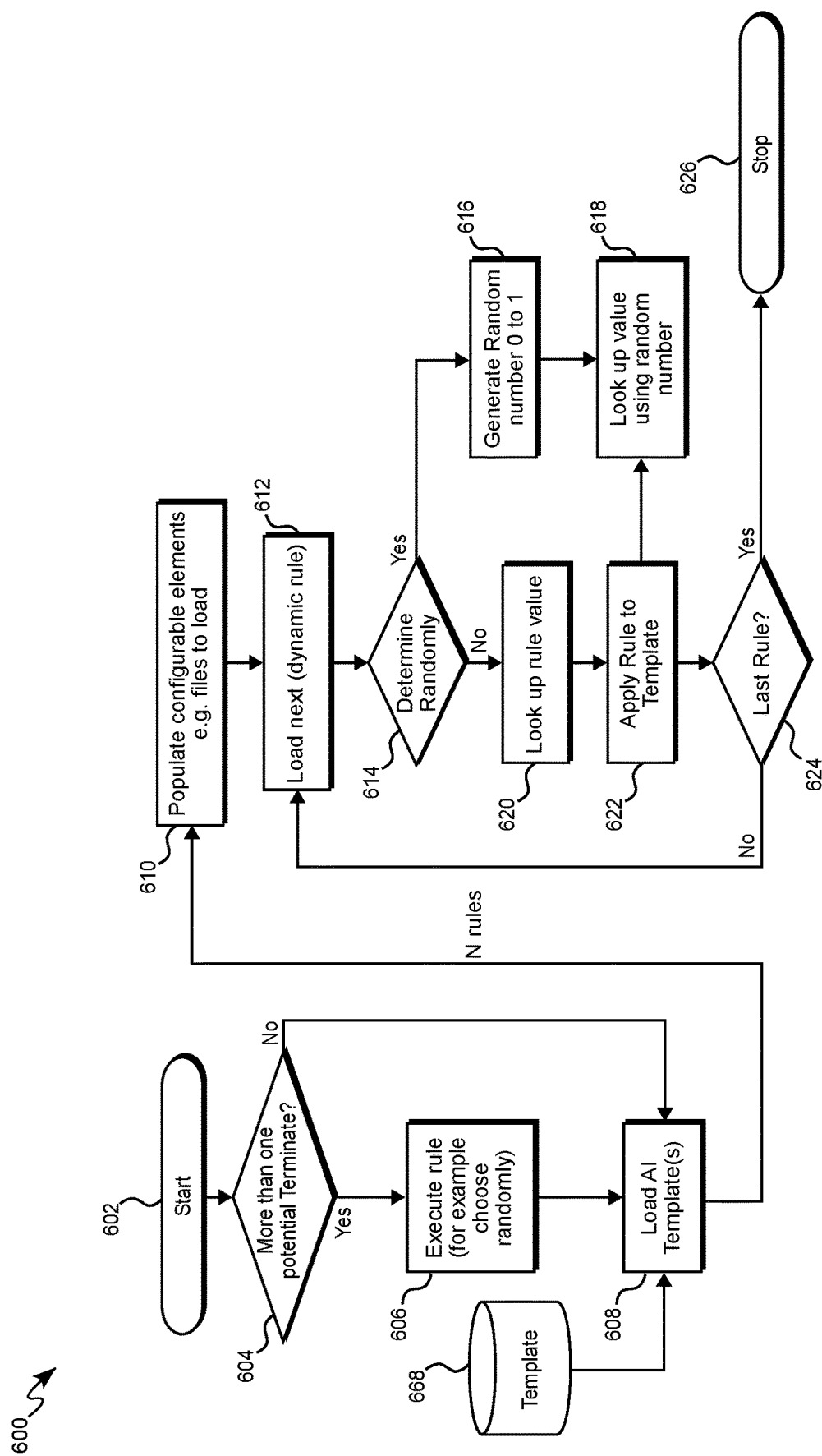
FIG. 6 is a diagram of some non-limiting embodiments or aspects of an agent template for use in the master template of FIG. 5, the implementation of FIG. 4, and/or the process shown in FIG. 3 according to the principles of the presently disclosed subject matter.

Referring now to FIG. 6, FIG. 6 is a diagram of an exemplary agent template for use in some non-limiting embodiments relating to the master template of FIG. 5, the implementation of FIG. 4, and/or the process shown in FIG. 3. As shown in FIG. 6, agent template 600 may include and/or use template database 668. In some non-limiting embodiments or aspects, template database 668 may be the same as, similar to, and/or include ML/AI templates database 468 and/or knowledgebase 560. In some non-limiting embodiments or aspects, template database 668 may be part of or similar to transaction service provider system 102 (e.g., one or more devices of transaction service provider system 102). In some non-limiting embodiments or aspects, template database 668 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, one or more of the steps of agent template 600 may be performed (e.g., completely, partially, and/or the like) by transaction service provider system 102 (e.g., one or more devices of transaction service provider system 102). In some non-limiting embodiments or aspects, one or more of the steps of agent template 600 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 6, at step 602, agent template 600 may include a starting point. As shown in FIG. 6, at step 604, agent template 600 may include determining (e.g., by transaction service provider system 102, another system, another device, and/or the like) whether there is more than one potential predictive model template associated with agent template 600.

As shown in FIG. 6, at step 606, agent template 600 may include executing a rule for selecting the predictive model template if there is more than one potential predictive model template. For example, the rule for selecting the predictive model template from a plurality of predictive model templates associated with agent template 600 may be executed (e.g., by transaction service provider system 102, another system, another device, and/or the like), as described herein. In some non-limiting embodiments or aspects, the rule may include randomly selecting a predictive model template from the plurality of predictive model templates associated with agent template 600.

As shown in FIG. 6, at step 608, agent template 600 may include loading the predictive model template, as described herein. For example, the predictive model template may be loaded (e.g., by transaction service provider system 102, another system, another device, and/or the like) from template database 668.

As shown in FIG. 6, at step 610, agent template 600 may include populating configurable elements (fields, parameters, variables, settings, and/or the like) of agent template 600, as described herein. For example, the agent genome and/or the agent predictive model may be used to populate the agent template (e.g., by transaction service provider system 102, another system, another device, and/or the like).

As shown in FIG. 6, at step 612, agent template 600 may include at least one loading rule of the set of rules of agent template 600, as described herein. For example, the set of rules (which may include, e.g., dynamic rules, static rules, and/or the like) may be loaded (e.g., by transaction service provider system 102, another system, another device, and/or the like). In some non-limiting embodiments or aspects, such rule(s) may correspond to the current step(s) of the process (e.g., process 300, implementation 400, and/or the like) being performed/executed.

As shown in FIG. 6, at step 614, agent template 600 may include determining whether a given rule of the set of rules uses a random determination/selection. For example, whether a given rule of the set of rules uses a random determination/selection may be determined (e.g., by transaction service provider system 102, another system, another device, and/or the like). If so, in some non-limiting embodiments as shown in FIG. 6, at step 616, agent template 600 may include generating a random number, as described herein. For example, a random number (e.g., from a uniform distribution between 0 and 1) may be generated (e.g., by transaction service provider system 102, another system, another device, and/or the like). Additionally or alternatively, as shown in FIG. 6, at step 618, agent template 600 may include determining a value for the rule based on the random number. For example, a value for the rule may be determined (e.g., calculated, looked up, and/or the like) based on the random number (e.g., by transaction service provider system 102, another system, another device, and/or the like).

As shown in FIG. 6, at step 620, if no random determination/selection is to be used, agent template 600 may include determining a value for the rule, as described herein. For example, a value for the rule may be determined (e.g., calculated, looked up, and/or the like), e.g., by transaction service provider system 102, another system, another device, and/or the like.

As shown in FIG. 6, at step 622, agent template 600 may include applying the rule, as described herein. For example, the rule may be applied (e.g., by transaction service provider system 102, another system, another device, and/or the like) based on the value determined in at least one of step 618 and/or 620.

As shown in FIG. 6, at step 624, agent template 600 may include determining whether the rule is the last of the set of rules, as described herein. For example, whether the rule is the last of the set of rules (e.g., the Nth rule of a set of N rules) may be determined (e.g., by transaction service provider system 102, another system, another device, and/or the like).

As shown in FIG. 6, at step 626, agent template 600 may include a stopping point.

Figure 7:
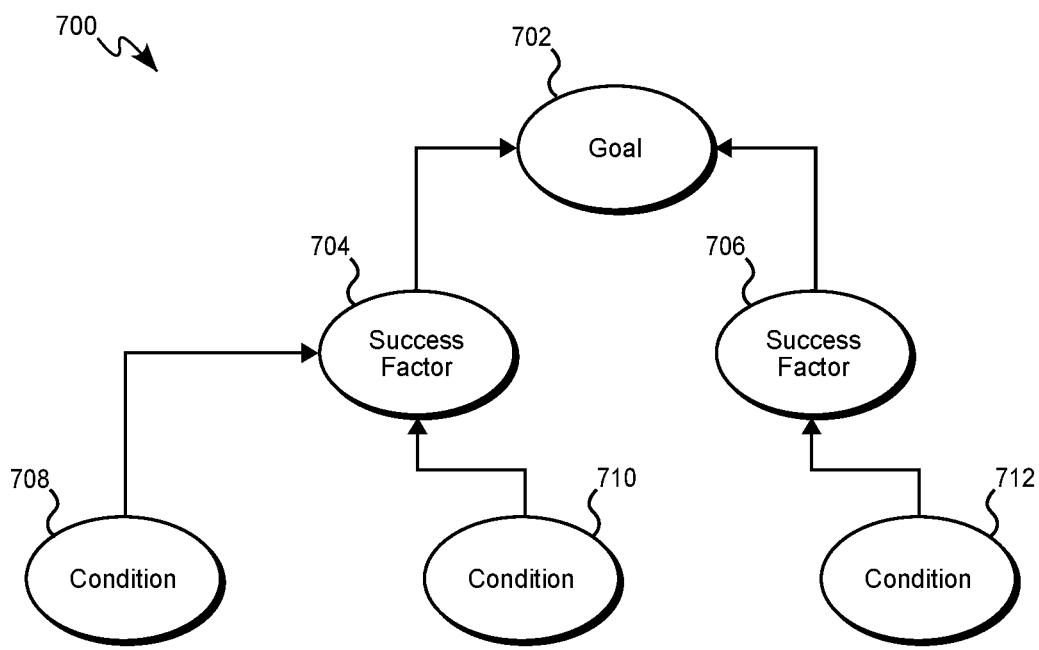
FIG. 7 is a diagram of some non-limiting embodiments or aspects of a goal template for use in the master template of FIG. 5, the implementation of FIG. 4, and/or the process shown in FIG. 3 according to the principles of the presently disclosed subject matter.

Referring now to FIG. 7, FIG. 7 is a diagram of an exemplary goal template for use in some non-limiting embodiments relating to the master template of FIG. 5, the implementation of FIG. 4, and/or the process shown in FIG. 3. As shown in FIG. 7, goal template 700 may include conditions 708, 710, 712; success factors 704, 706; and/or goal 702. In some non-limiting embodiments or aspects, goal template 700 may be the same as, similar to, and/or part of goals tree database 466 and/or knowledgebase 560. In some non-limiting embodiments or aspects, goal template 700 may be part of or included in transaction service provider system 102 (e.g., one or more devices of transaction service provider system 102). In some non-limiting embodiments or aspects, goal template 700 may be part of or included in another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

In some non-limiting embodiments or aspects, whether goal 702 is satisfied may be determined (e.g., by transaction service provider system 102, another system, another device, and/or the like), as described herein. In some non-limiting embodiments or aspects, whether goal 702 is satisfied may be based on at least one success factor 704, 706, as described herein. Additionally or alternatively, whether goal 702 is satisfied may be based on at least one condition 708, 710, 712, as described herein.

In some non-limiting embodiments or aspects, each success factor 704, 706 may be based on at least one condition 708, 710, 712. For example, first success factor 704 may be based on first condition 708, second condition 710, and/or a combination thereof. Additionally or alternatively, second success factor 706 may be based on third condition 712. Additionally or alternatively, goal 702 may be based on first success factor 704, second success factor 706, and/or a combination thereof.

Figure 8:
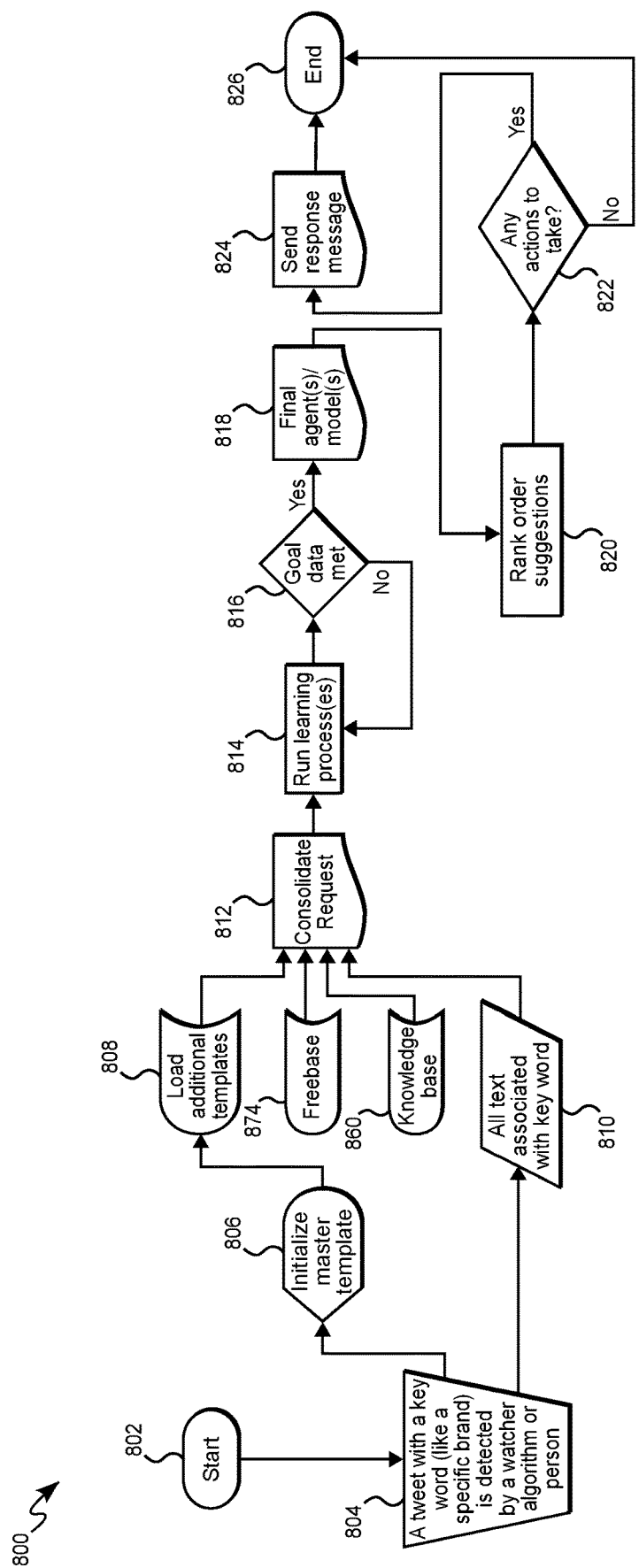
FIG. 8 is a diagram of some non-limiting embodiments or aspects of an implementation of the non-limiting embodiment or aspect of the process shown in FIG. 3 according to the principles of the presently disclosed subject matter.

Referring now to FIG. 8, FIG. 8 is a diagram of an exemplary implementation 800 of a non-limiting embodiment relating to process 300 shown in FIG. 3. As shown in FIG. 8, implementation 800 may include at least one knowledge base 860 and/or at least one data source database 874. In some non-limiting embodiments or aspects, knowledge base 860 and data source database 874 may be the same database. In some non-limiting embodiments or aspects, knowledge base 860 may be the same as or similar to one or more of the behavior trees database 462, strategies database 464, goals tree database 466, ML/AI templates database 468, successful traits database 470, immunity knowledge database 472, knowledgebase 560, template database 668, and/or the like. In some non-limiting embodiments or aspects, knowledge base 860 and data source database 874 may be part of or similar to transaction service provider system 102 (e.g., one or more devices of transaction service provider system 102). In some non-limiting embodiments or aspects, one or more of knowledge base 860 and/or data source database 874 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, data source database 874 may be an external database such as FreeBase and/or the like. In some non-limiting embodiments or aspects, one or more of the steps of implementation 800 may be performed (e.g., completely, partially, and/or the like) by transaction service provider system 102 (e.g., one or more devices of transaction service provider system 102). In some non-limiting embodiments or aspects, one or more of the steps of implementation 800 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 8, at step 802, implementation 800 may include a starting point. As shown in FIG. 8, at step 804, implementation 800 may include receiving (e.g., by transaction service provider system 102, another system, another device, and/or the like) media data (e.g., social media posting such as a tweet on Twitter®, audio data, visual data, audio-visual data, written data, and/or the like) including a keyword (e.g., a brand name and/or the like). In some non-limiting embodiments or aspects, when a keyword is included in media data, dynamic, real-time decision making may be beneficial. As such, at least one predictive learning model may be useful in determining information about the keyword. For example, such information may include a mood associated with the media data including the keyword, network trends (e.g., whether the keyword forms a new network), estimated impact of the keyword, how similar the media data including the keyword is to past events, a rank order of strategies for the media data including the keyword given past events (e.g., respond or not respond), and/or the like.

As shown in FIG. 8, at step 806, implementation 800 may include loading a master template (e.g., master template for media data response), as described herein. The master template may be initialized, e.g., by transaction service provider system 102, another system, another device, and/or the like.

As shown in FIG. 8, at step 808, implementation 800 may include loading (e.g., by transaction service provider system 102, another system, another device, and/or the like) additional templates (e.g., agent template(s), predictive model template(s), goal template(s), and/or the like), as described herein.

As shown in FIG. 8, at step 810, implementation 800 may include providing (e.g., receiving, communicating, storing, and/or the like) the media data. For example, if the media data is textual, all text associated with the media data may be provided (e.g., by transaction service provider system 102, another system, another device, and/or the like). Additionally or alternatively, if the media data includes audio and/or visual data, all such audio and/or visual data may be provided (e.g., by transaction service provider system 102, another system, another device, and/or the like). In some non-limiting embodiments or aspects, where the media data contains text, images of text, and/or spoken words, at least one of the following may be performed (e.g., by transaction service provider system 102, another system, another device, and/or the like) to make the media data more usable: parsing of text/words, optical character recognition, speech recognition, and/or natural language processing.

As shown in FIG. 8, at step 812, implementation 800 may include consolidating a request. For example, a request may be consolidated (e.g., by transaction service provider system 102, another system, another device, and/or the like) based on the loaded templates, media data, data from data source database 874, data from knowledge base 860, and/or the like.

In some non-limiting embodiments or aspects, when data source database 874 includes a wiki-derived graph database such as FreeBase, keyword association may be performed (e.g., by transaction service provider system 102, another system, another device, and/or the like) on the media data (e.g., text and/or the like). Additionally or alternatively, the media data may be vectorized.

As shown in FIG. 8, at step 814, implementation 800 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 8, at step 816, implementation 800 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning process(es) at step 814 may be repeated. If the goal data is satisfied, implementation 800 may proceed to the next step(s).

As shown in FIG. 8, at step 818, implementation 800 may include providing (e.g., storing, communicating, and/or the like) the final agent(s) and/or model(s) (e.g., predictive model templates) after the learning process(es), as described herein. For example, the final agent(s) and/or model(s) may be provided by transaction service provider system 102, another system, another device, and/or the like.

As shown in FIG. 8, at step 820, implementation 800 may include ranking suggestions based on the final agent(s)/model(s), as described herein. For example, suggestions may be ranked (e.g., by transaction service provider system 102, another system, another device, and/or the like) based on the fitness of the agent(s)/model(s) associated with each suggestion. Additionally or alternatively, results associated with each agent/model may be ranked based on predefined criteria, such as historical mean squared error of the agent/model, similarity of a result to a predefined information/result vector (e.g., a user's profile vs a result's avatar profile associated with a hypothetical user profile most closely associated with the result), and/or the like.

As shown in FIG. 8, at step 822, implementation 800 may include determining whether any actions are associated with the suggestions. For example, a determination of whether any actions are associated with the suggestions may be performed (e.g., by transaction service provider system 102, another system, another device, and/or the like). If at least one action is associated with at least one suggestion, the action may be taken in the next step(s). Additionally or alternatively, if no actions are associated with the suggestions, implementation 800 may terminate at the next step(s). In some non-limiting embodiments or aspects, suggestions may be based on querying a predefined behavior tree, e.g., a graph associating outcomes with a series of conditions associated with at least one suggestion.

As shown in FIG. 8, at step 824, implementation 800 may include taking action(s). For example, actions may be taken (e.g., by transaction service provider system 102, another system, another device, and/or the like) based on the suggestions associated therewith. In some non-limiting embodiments or aspects, the action(s) may include sending (e.g., by transaction service provider system 102, another system, another device, and/or the like) a response message to the media data.

As shown in FIG. 8, at step 826, implementation 800 may include an ending point.

Figure 9:
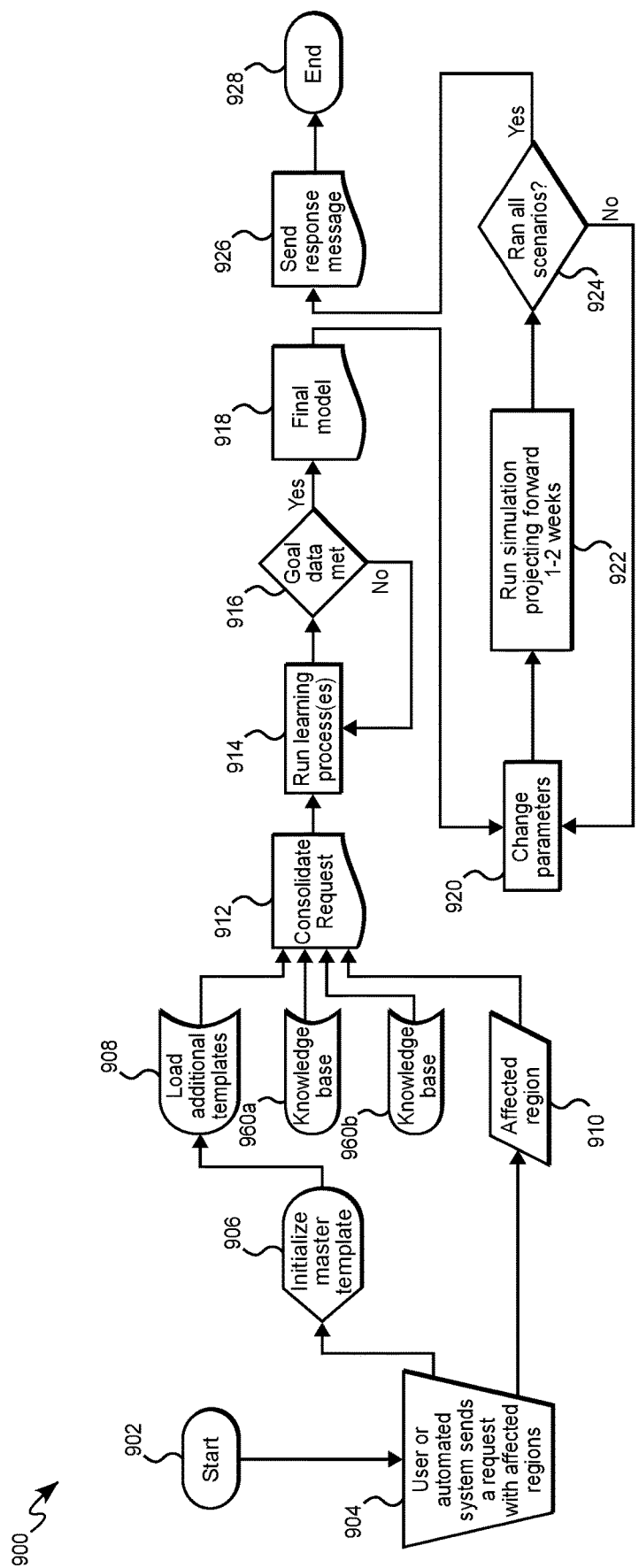
FIG. 9 is a diagram of some non-limiting embodiments or aspects of an implementation of the non-limiting embodiment or aspect of the process shown in FIG. 3 according to the principles of the presently disclosed subject matter.

Referring now to FIG. 9, FIG. 9 is a diagram of an exemplary implementation 900 of a non-limiting embodiment relating to process 300 shown in FIG. 3. As shown in FIG. 9, implementation 900 may include at least one knowledgebase 960a, 960b. In some non-limiting embodiments or aspects, knowledgebases 960a, 960b may be the same database. In some non-limiting embodiments or aspects, knowledgebases 960a, 960b may be the same as or similar to one or more of the behavior trees database 462, strategies database 464, goals tree database 466, ML/AI templates database 468, successful traits database 470, immunity knowledge database 472, knowledgebase 560, template database 668, knowledge base 860, and/or the like. In some non-limiting embodiments or aspects, knowledgebases 960a, 960b may be part of or similar to transaction service provider system 102 (e.g., one or more devices of transaction service provider system 102). In some non-limiting embodiments or aspects, one or more of knowledgebases 960a, 960b may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, at least one of knowledgebases 960a, 960b may be an external database such as the U.S. Geological Survey (USGS) data feed. In some non-limiting embodiments or aspects, one or more of the steps of implementation 900 may be performed (e.g., completely, partially, and/or the like) by transaction service provider system 102 (e.g., one or more devices of transaction service provider system 102). In some non-limiting embodiments or aspects, one or more of the steps of implementation 900 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 9, at step 902, implementation 900 may include a starting point. As shown in FIG. 9, at step 904, implementation 900 may include receiving (e.g., by transaction service provider system 102, another system, another device, and/or the like) natural disaster data (e.g., a request identifying a type of natural disaster, an affected region, and/or the like). In some non-limiting embodiments or aspects, when natural disaster data is received, dynamic, real-time decision making may be beneficial. As such, at least one predictive learning model may be useful in determining information about the natural disaster. For example, such information may include an impact estimate, a recovery time prediction, a network weakness detection (e.g., reduced communication network resources, reduced fuel stations, and/or the like), scenarios modeling to provide insights (e.g., to governments, companies, and/or the like) how to best allocate resources and/or assistance, and/or the like.

As shown in FIG. 9, at step 906, implementation 900 may include loading a master template (e.g., master template for natural disaster data response), as described herein. The master template may be initialized, e.g., by transaction service provider system 102, another system, another device, and/or the like.

As shown in FIG. 9, at step 908, implementation 900 may include loading (e.g., by transaction service provider system 102, another system, another device, and/or the like) additional templates (e.g., agent template(s), predictive model template(s), goal template(s), and/or the like), as described herein.

As shown in FIG. 9, at step 910, implementation 900 may include providing (e.g., receiving, communicating, storing, and/or the like) the natural disaster data (e.g., affected region, type of disaster, and/or the like), as described herein. For example, the natural disaster data may be communicated, e.g., by transaction service provider system 102, another system, another device, and/or the like.

As shown in FIG. 9, at step 912, implementation 900 may include consolidating a request. For example, a request may be consolidated (e.g., by transaction service provider system 102, another system, another device, and/or the like) based on the loaded templates, natural disaster data, data from knowledgebase(s) 960a, 960b, and/or the like.

As shown in FIG. 9, at step 914, implementation 900 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 9, at step 916, implementation 900 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning processes at step 914 may be repeated. If the goal data is satisfied, implementation 900 may proceed to the next step(s).

As shown in FIG. 9, at step 918, implementation 900 may include providing (e.g., storing, communicating, and/or the like) the final agent(s) and/or model(s) (e.g., predictive model templates) after the learning process(es), as described herein. For example, the final agent(s) and/or model(s) may be provided, e.g., by transaction service provider system 102, another system, another device, and/or the like.

As shown in FIG. 9, at step 920, implementation 900 may include changing the final agent(s)/model(s), e.g., by changing the set of rules, fields, parameters, variables, settings, and/or the like associated with such agent(s)/model(s). For example, the changes may be made (e.g., by transaction service provider system 102, another system, another device, and/or the like) based on data regarding possible scenarios.

As shown in FIG. 9, at step 922, implementation 900 may include running simulations. For example, such simulations may be performed (e.g., by transaction service provider system 102, another system, another device, and/or the like) based on the agent(s)/model(s). In some non-limiting embodiments or aspects, exemplary simulations and running thereof may be the same as or similar to the simulations described in U.S. Provisional Patent Application No. 62/702,794, filed Jul. 24, 2018, the disclosure of which is hereby incorporated by reference in its entirety. For example, a simulated world may be created. Additionally or alternatively, the simulated world may be occupied by at least one of simulants and/or replicates. In some non-limiting embodiments or aspects, the simulated world, the simulants, and/or the replicates may be based on overlapping communities. Additionally or alternatively, the simulated world, the simulants, and/or the replicates may be tuned through adversarial artificial intelligence/predictive models (e.g., generative adversarial networks and/or the like). In some non-limiting embodiments or aspects, simulants, and/or the replicates may be modeled using a pollinator/plant framework (e.g., simulant individuals/consumers/card holders as pollinators, simulant merchants as plants, and/or the like). Additionally or alternatively, the interactions between simulants, and/or the replicates (e.g., simulant individuals/consumers/card holders, simulant merchants, and/or the like) may be any suitable type of interaction (e.g., a transaction such as a payment transaction and/or the like). In some non-limiting embodiments or aspects, the simulated world may run in epochs. Additionally or alternatively, in each epoch, each modeled component (e.g., simulants and/or replicates) may be updated. In some non-limiting embodiments or aspects, the simulated world, the simulants, and/or the replicates may be exposed to a simulated event (e.g., a simulated natural disaster, a simulated sale, a simulated data breach, a simulated exogenous event, and/or the like). For example, each simulated event may be based on at least one variable, including duration, scale, impact, and/or the like. Based on subjecting the simulated world, the simulants, and/or the replicates to events, trends may be projected and/or the like.

As shown in FIG. 9, at step 924, implementation 900 may include determining whether simulations for all possible scenarios in the data regarding possible scenarios has been run. For example, such a determination may be made (e.g., by transaction service provider system 102, another system, another device, and/or the like) based on the agent(s)/model(s) and the data regarding possible scenarios.

As shown in FIG. 9, at step 926, implementation 900 may include sending a response message. For example, a response message may be communicated (e.g., by transaction service provider system 102, another system, another device, and/or the like) based on natural disaster data, the agent(s)/model(s), the simulations, and/or the like.

As shown in FIG. 9, at step 928, implementation 900 may include an ending point.

Figure 10:
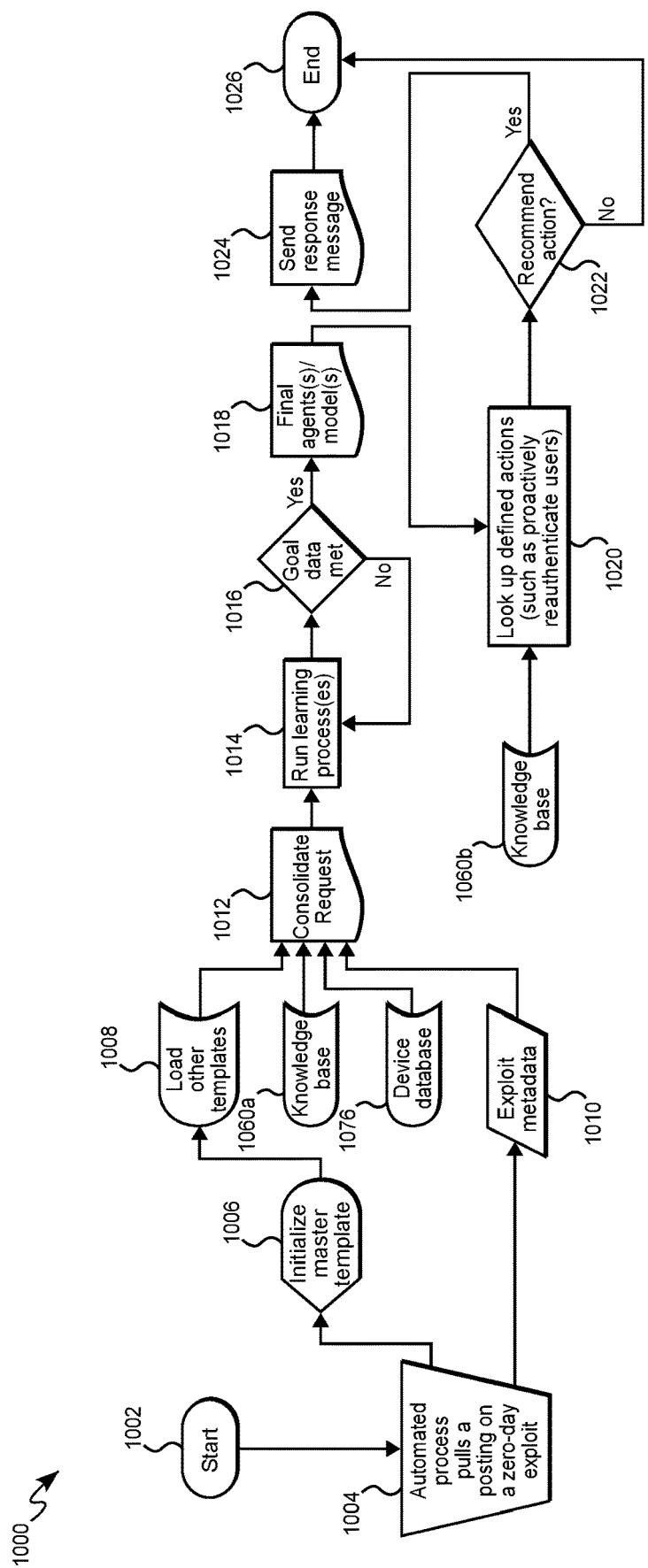
FIG. 10 is a diagram of some non-limiting embodiments or aspects of an implementation of the non-limiting embodiment or aspect of the process shown in FIG. 3 according to the principles of the presently disclosed subject matter.

Referring now to FIG. 10, FIG. 10 is a diagram of an exemplary implementation 1000 of a non-limiting embodiment relating to process 300 shown in FIG. 3. As shown in FIG. 10, implementation 1000 may include at least one knowledgebase 1060a, 1060b and/or at least one device database 1076. In some non-limiting embodiments or aspects, knowledgebases 1060*a*, 1060*b* and device database 1076 may be the same database. In some non-limiting embodiments or aspects, knowledgebases 1060*a*, 1060*b* may be the same as or similar to one or more of the behavior trees database 462, strategies database 464, goals tree database 466, ML/AI templates database 468, successful traits database 470, immunity knowledge database 472, knowledgebase 560, template database 668, and/or the like. In some non-limiting embodiments or aspects, knowledgebases 1060*a*, 1060*b* and device database 1076 may be part of or similar to transaction service provider system 102 (e.g., one or more devices of transaction service provider system 102). In some non-limiting embodiments or aspects, one or more of knowledgebases 1060*a*, 1060*b* and device database 1076 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, device database 1076 may be an external database of devices affected by an exploit, such as an attack, a virus, a vulnerability, and/or the like. In some non-limiting embodiments or aspects, one or more of the steps of implementation 1000 may be performed (e.g., completely, partially, and/or the like) by transaction service provider system 102 (e.g., one or more devices of transaction service provider system 102). In some non-limiting embodiments or aspects, one or more of the steps of implementation 1000 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 10, at step 1002, implementation 1000 may include a starting point. As shown in FIG. 10, at step 1004, implementation 1000 may include receiving (e.g., by transaction service provider system 102, another system, another device, and/or the like) exploit data (e.g., an exploit, such as an attack, a virus, a vulnerability, and/or the like). For example, such exploit data may be from a verified and/or trusted source, including a virus and/or malware protection company, a validated message board, and/or the like. In some non-limiting embodiments or aspects, when exploit data is received, dynamic, real-time decision making may be beneficial. As such, at least one predictive learning model may be useful in determining information about the exploit. For example, such information may include recommended actions, e.g., to mitigate risk, resolve the exploit, and/or the like.

As shown in FIG. 10, at step 1006, implementation 1000 may include loading a master template (e.g., master template for exploit response), as described herein. The master template may be initialized, e.g., by transaction service provider system 102, another system, another device, and/or the like.

As shown in FIG. 10, at step 1008, implementation 1000 may include loading (e.g., by transaction service provider system 102, another system, another device, and/or the like) additional templates (e.g., agent template(s), predictive model template(s), goal template(s), and/or the like), as described herein.

As shown in FIG. 10, at step 1010, implementation 1000 may include providing (e.g., receiving, communicating, storing, and/or the like) the exploit data (e.g., metadata associated with the exploit, affected devices, rerouted IP addresses, and/or the like). For example, the exploit data may be provided, e.g., by transaction service provider system 102, another system, another device, and/or the like.

As shown in FIG. 10, at step 1012, implementation 1000 may include consolidating a request. For example, a request may be consolidated (e.g., by transaction service provider system 102, another system, another device, and/or the like) based on the loaded templates, exploit data, data from device database 1076, data from knowledge base 860, and/or the like.

As shown in FIG. 10, at step 1014, implementation 1000 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 10, at step 1016, implementation 1000 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning processes at step 1014 may be repeated. If the goal data is satisfied, implementation 1000 may proceed to the next step(s).

As shown in FIG. 10, at step 1018, implementation 1000 may include providing (e.g., storing, communicating, and/or the like) the final agent(s) and/or model(s) (e.g., predictive model templates) after the learning process(es), as described herein. For example, the final agent(s) and/or model(s) may be provided by transaction service provider system 102, another system, another device, and/or the like.

As shown in FIG. 10, at step 1020, implementation 1000 may include determining (e.g., selecting, looking up, ranking, and/or the like) actions (e.g., predefined actions, suggested actions, and/or the like), as described herein. For example, the actions may be determined (e.g., by transaction service provider system 102, another system, another device, and/or the like) based on the final agent(s)/model(s) (e.g., the fitness of the agent(s)/model(s) associated with each action), the knowledgebase 1060*b*, and/or the like. In some non-limiting embodiments or aspects, actions may be determined based on querying a predefined behavior tree associated with possible actions.

As shown in FIG. 10, at step 1022, implementation 1000 may include determining whether any of the aforementioned actions should be taken. For example, a determination of whether any actions should be taken may be performed (e.g., by transaction service provider system 102, another system, another device, and/or the like) based on the selected actions, the final agent(s)/model(s), and/or the like. If at least one action should be taken, the action may be taken in the next step(s). Additionally or alternatively, if no actions should be taken, implementation 1000 may terminate at the next step(s). In some non-limiting embodiments or aspects, whether to take such action(s) may be determined based on querying a predefined behavior tree associated with possible actions.

As shown in FIG. 10, at step 1024, implementation 1000 may include taking action(s). For example, actions may be taken (e.g., by transaction service provider system 102, another system, another device, and/or the like) based on the suggestions associated therewith. In some non-limiting embodiments or aspects, the action(s) may include sending (e.g., by transaction service provider system 102, another system, another device, and/or the like) a response message associated with the exploit data.

As shown in FIG. 10, at step 1026, implementation 1000 may include an ending point.

Figure 11:
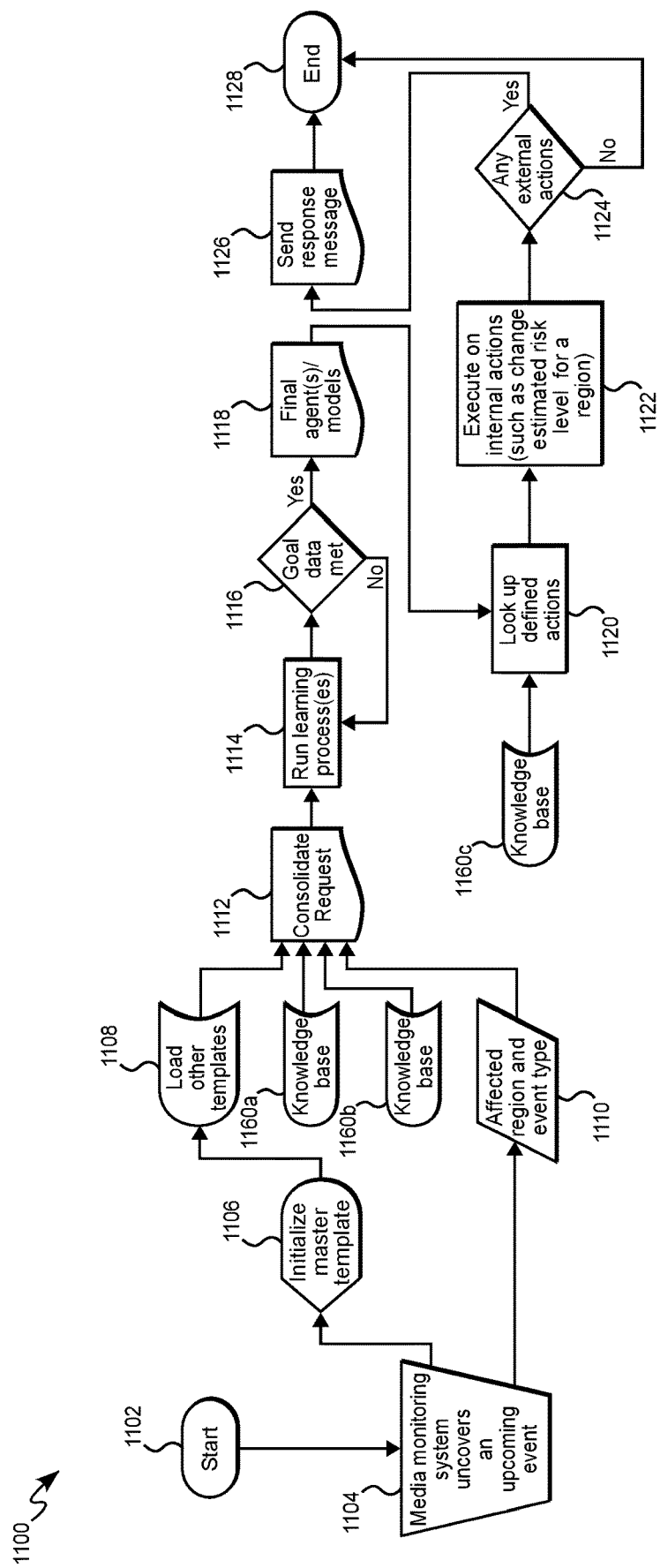
FIG. 11 is a diagram of some non-limiting embodiments or aspects of an implementation of the non-limiting embodiment or aspect of the process shown in FIG. 3 according to the principles of the presently disclosed subject matter.

Referring now to FIG. 11, FIG. 11 is a diagram of an exemplary implementation 1100 of a non-limiting embodiment relating to process 300 shown in FIG. 3. As shown in FIG. 11, implementation 1100 may include at least one knowledgebase 1160a, 1160b, 1160c. In some non-limiting embodiments or aspects, knowledgebases 1160a, 1160b, 1160c may be the same database. In some non-limiting embodiments or aspects, knowledgebases 1160a, 1160b, 1160c may be the same as or similar to one or more of the behavior trees database 462, strategies database 464, goals tree database 466, ML/AI templates database 468, successful traits database 470, immunity knowledge database 472, knowledgebase 560, template database 668, knowledge base 860, knowledgebases 960a, 960b, device database 1076, knowledgebases 1060a, 1060b, and/or the like. In some non-limiting embodiments or aspects, knowledgebases 1160a, 1160b, 1160c may be part of or similar to transaction service provider system 102 (e.g., one or more devices of transaction service provider system 102). In some non-limiting embodiments or aspects, one or more of knowledgebases 1160a, 1160b, 1160c may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, at least one of knowledgebases 1160a, 1160b, 1160c may be an external database such as FreeBase and/or the like. In some non-limiting embodiments or aspects, one or more of the steps of implementation 1100 may be performed (e.g., completely, partially, and/or the like) by transaction service provider system 102 (e.g., one or more devices of transaction service provider system 102). In some non-limiting embodiments or aspects, one or more of the steps of implementation 1100 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 11, at step 1102, implementation 1100 may include a starting point. As shown in FIG. 11, at step 1104, implementation 1100 may include receiving (e.g., by transaction service provider system 102, another system, another device, and/or the like) public event data (e.g., data from a public database such as FreeBase and/or the like associated with a public event such as a sporting event, community event, concert event, holiday event, and/or the like). In some non-limiting embodiments or aspects, when public event data is received, dynamic, real-time decision making may be beneficial. As such, at least one predictive learning model may be useful in determining information about the public event. For example, such information may include a list/set of similar prior events, predicted outcomes of the public event, spending pattern changes of individuals in proximity to the public event, fraud risk associated with the public event, transactional metrics associated with the public event, and/or the like.

As shown in FIG. 11, at step 1106, implementation 1100 may include loading a master template (e.g., master template for public event data response), as described herein. The master template may be initialized, e.g., by transaction service provider system 102, another system, another device, and/or the like As shown in FIG. 11, at step 1108, implementation 1100 may include loading (e.g., by transaction service provider system 102, another system, another device, and/or the like) additional templates (e.g., agent template(s), predictive model template(s), goal template(s), and/or the like), as described herein.

As shown in FIG. 11, at step 1110, implementation 1100 may include providing (e.g., receiving, communicating, storing, and/or the like) the public event data (e.g., affected region, type of event, and/or the like), as described herein. For example, the public event data may be communicated, e.g., by transaction service provider system 102, another system, another device, and/or the like.

As shown in FIG. 11, at step 1112, implementation 1100 may include consolidating a request. For example, a request may be consolidated (e.g., by transaction service provider system 102, another system, another device, and/or the like) based on the loaded templates, public event data, data from knowledgebase(s) 1160a, 1160b, and/or the like.

As shown in FIG. 11, at step 1114, implementation 1100 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 11, at step 1116, implementation 1100 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning process(es) at step 1114 may be repeated. If the goal data is satisfied, implementation 1100 may proceed to the next step(s).

As shown in FIG. 11, at step 1118, implementation 1100 may include providing (e.g., storing, communicating, and/or the like) the final agent(s) and/or model(s) (e.g., predictive model templates) after the learning process(es), as described herein. For example, the final agent(s) and/or model(s) may be provided, e.g., by transaction service provider system 102, another system, another device, and/or the like.

As shown in FIG. 11, at step 1120, implementation 1100 may include determining (e.g., selecting, looking up, ranking, and/or the like) actions (e.g., predefined actions, suggested actions, and/or the like), as described herein. For example, the actions may be determined (e.g., by transaction service provider system 102, another system, another device, and/or the like) based on the final agent(s)/model(s) (e.g., the fitness of the agent(s)/model(s) associated with each action), the knowledgebase 1160c, and/or the like. In some non-limiting embodiments or aspects, actions may be determined based on querying a predefined behavior tree associated with possible actions.

As shown in FIG. 11, at step 1122, implementation 1100 may include taking internal actions. For example, such internal actions may be taken by, e.g., transaction service provider system 102, another system, another device, and/or the like. In some non-limiting embodiments or aspects, internal actions may include adjusting an estimated risk level for the region based on the final agent(s)/model(s), the public event data, and/or the like.

As shown in FIG. 11, at step 1124, implementation 1100 may include determining whether external actions should be taken. For example, a determination of whether any external actions should be taken may be performed (e.g., by transaction service provider system 102, another system, another device, and/or the like) based on selected external actions of the selected actions, the final agent(s)/model(s), and/or the like. If at least one external action should be taken, the action may be taken in the next step(s). Additionally or alternatively, if no actions should be taken, implementation 1100 may terminate at the next step(s). In some non-limiting embodiments or aspects, determining whether such action(s) should be take may be determined based on querying a predefined behavior tree associated with possible actions.

As shown in FIG. 11, at step 1124, implementation 1100 may include taking external action(s). For example, external actions may be taken (e.g., by transaction service provider system 102, another system, another device, and/or the like) based on the selected external actions of the selected actions, the final agent(s)/model(s), and/or the like. In some non-limiting embodiments or aspects, at step 1126, the action(s) may include sending (e.g., by transaction service provider system 102, another system, another device, and/or the like) a response message associated with the public event data.

As shown in FIG. 11, at step 1128, implementation 1100 may include an ending point.

Figure 12:
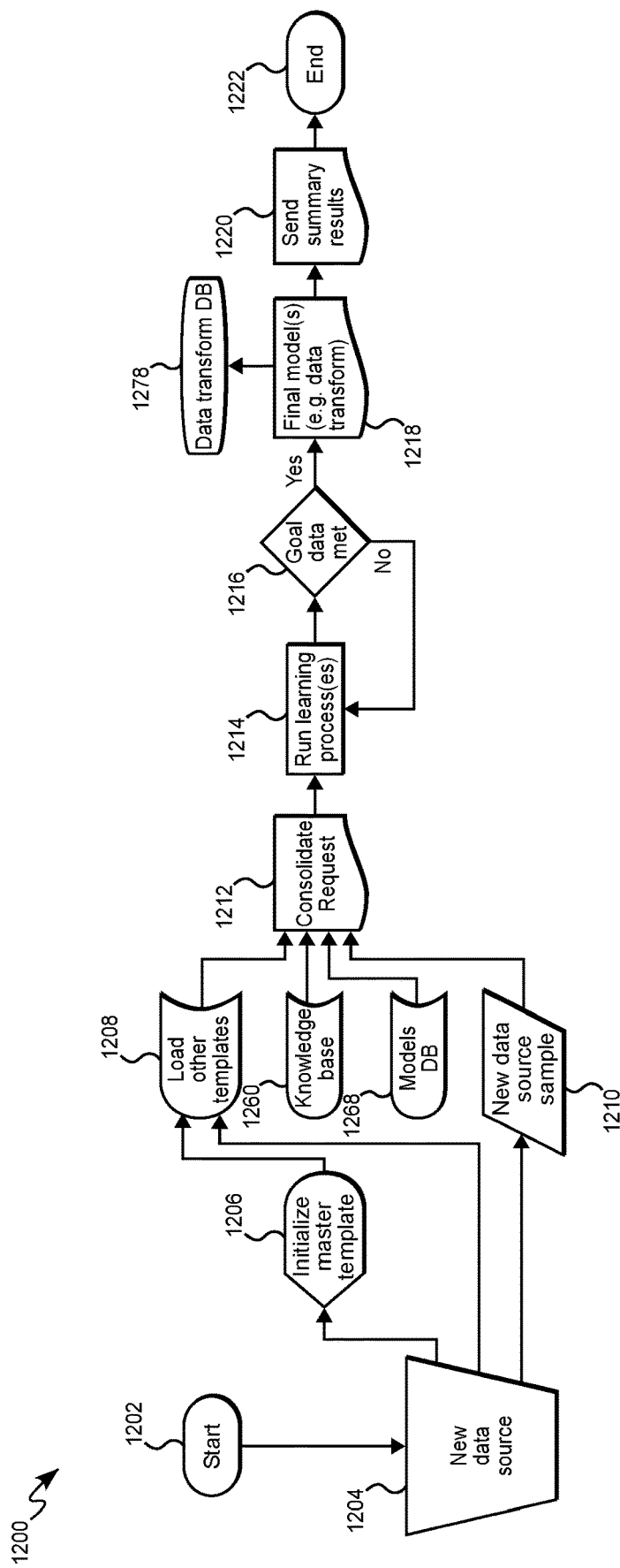
FIG. 12 is a diagram of some non-limiting embodiments or aspects of an implementation of the non-limiting embodiment or aspect of the process shown in FIG. 3 according to the principles of the presently disclosed subject matter.

Referring now to FIG. 12, FIG. 12 is a diagram of an exemplary implementation 1200 of a non-limiting embodiment relating to process 300 shown in FIG. 3. As shown in FIG. 12, implementation 1200 may include at least one knowledgebase 1260, at least one models database 1268, at least one data transform database 1278, and/or the like. In some non-limiting embodiments or aspects, knowledgebase 1260, models database 1268, and/or data transform database 1278 may be the same database. In some non-limiting embodiments or aspects, knowledgebase 1260 may be the same as or similar to one or more of the behavior trees database 462, strategies database 464, goals tree database 466, ML/AI templates database 468, successful traits database 470, immunity knowledge database 472, knowledgebase 560, template database 668, knowledge base 860, knowledgebases 960*a*, 960*b*, device database 1076, knowledgebases 1060*a*, 1060*b*, knowledgebases 1160*a*, 1160*b*, 1160*c*, and/or the like. In some non-limiting embodiments or aspects, models database 1268 may be the same as ML/AI templates database 468 and/or the like. In some non-limiting embodiments or aspects, knowledgebase 1260, models database 1268, and/or data transform database 1278 may be part of or similar to transaction service provider system 102 (e.g., one or more devices of transaction service provider system 102). In some non-limiting embodiments or aspects, one or more of knowledgebase 1260, models database 1268, and/or data transform database 1278 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, knowledgebase 1260 may include an external database. In some non-limiting embodiments or aspects, one or more of the steps of implementation 1200 may be performed (e.g., completely, partially, and/or the like) by transaction service provider system 102 (e.g., one or more devices of transaction service provider system 102). In some non-limiting embodiments or aspects, one or more of the steps of implementation 1200 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 12, at step 1202, implementation 1200 may include a starting point. As shown in FIG. 12, at step 1204, implementation 1200 may include receiving (e.g., by transaction service provider system 102, another system, another device, and/or the like) novel data (e.g., data from a new social media site, new third party data source, data not currently mapped into data transform database 1278, and/or the like). In some non-limiting embodiments or aspects, when novel data is received, dynamic, real-time decision making may be beneficial. As such, at least one predictive learning model may be useful in determining information about the novel data. For example, such information may include a novel data transform model (e.g., expressed as XML), relationships (e.g., three-tier relationships) between features of the novel data and/or predictive models trained thereon, and/or the like.

As shown in FIG. 12, at step 1206, implementation 1200 may include loading a master template (e.g., master template for novel data response), as described herein. The master template may be initialized, e.g., by transaction service provider system 102, another system, another device, and/or the like.

As shown in FIG. 12, at step 1208, implementation 1200 may include loading (e.g., by transaction service provider system 102, another system, another device, and/or the like) additional templates (e.g., agent template(s), predictive model template(s), goal template(s), and/or the like), as described herein.

As shown in FIG. 12, at step 1210, implementation 1200 may include providing (e.g., receiving, communicating, storing, and/or the like) the novel data, as described herein. For example, the novel data may be communicated, e.g., by transaction service provider system 102, another system, another device, and/or the like.

As shown in FIG. 12, at step 1212, implementation 1200 may include consolidating a request. For example, a request may be consolidated (e.g., by transaction service provider system 102, another system, another device, and/or the like) based on the loaded templates, novel data, data from knowledgebase 1260, models database 1268, and/or the like.

As shown in FIG. 12, at step 1214, implementation 1200 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 12, at step 1216, implementation 1200 may include determining whether goal data is satisfied, as described herein. In some non-limiting embodiments or aspects, a determination of whether the goal data is satisfied may be performed (e.g., by transaction service provider system 102, another system, another device, and/or the like)

based on a goal template, as described herein. If the goal data is not satisfied, the learning processes at step 1214 may be repeated. If the goal data is satisfied, implementation 1200 may proceed to the next step(s).

As shown in FIG. 12, at step 1218, implementation 1200 may include providing (e.g., storing, communicating, and/or the like) the final agent(s) and/or model(s) (e.g., predictive model templates) after the learning process(es), as described herein. For example, the final agent(s) and/or model(s) may be provided, e.g., by transaction service provider system 102, another system, another device, and/or the like. Additionally or alternatively, the final agent(s) and/or model(s) may be stored in the data transform database 1278.

As shown in FIG. 12, at step 1220, implementation 1200 may include communicating (e.g., sending, transmitting, displaying, and/or the like) a summary of the results (e.g., fitness of the top performing model(s)/winner(s), success of the model(s) in transforming the novel data, and/or the like), as described herein. For example, the results may be communicated (e.g., by transaction service provider system 102, another system, another device, and/or the like) based on the final agent(s)/model(s) (e.g., as stored in data transform database 1278), and/or the like.

As shown in FIG. 12, at step 1222, implementation 1200 may include an ending point.

Figure 13:
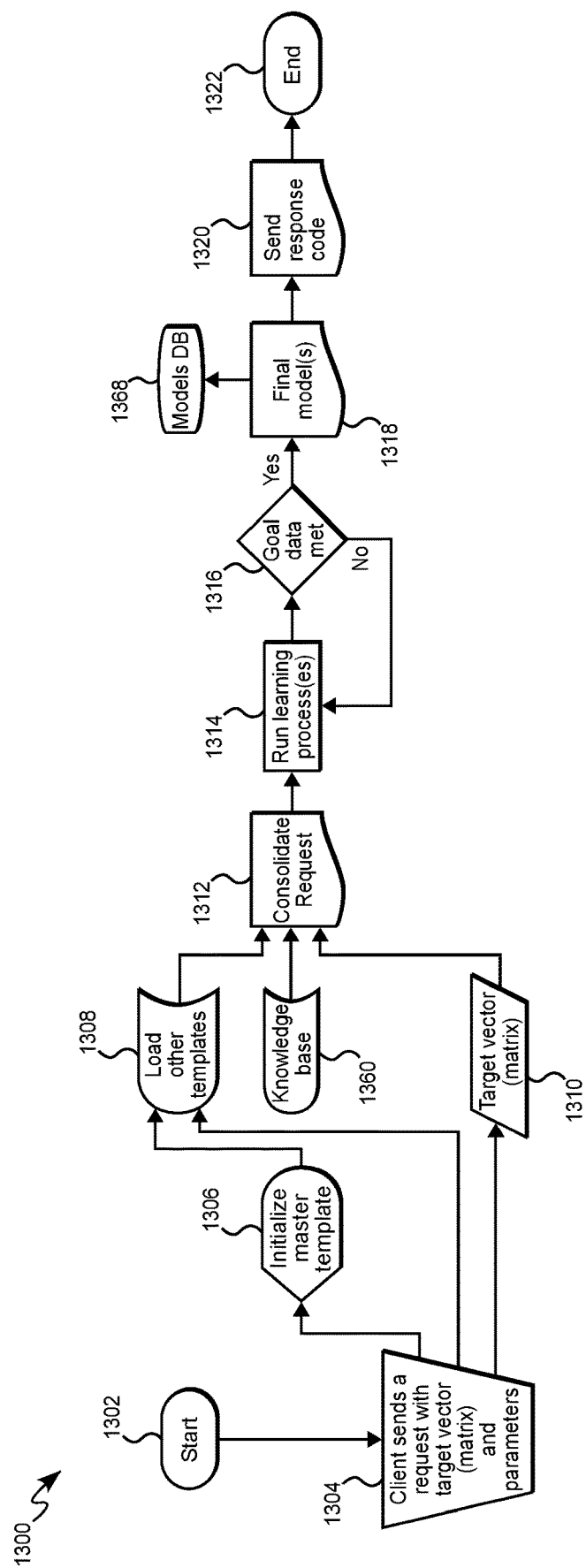
FIG. 13 is a diagram of some non-limiting embodiments or aspects of an implementation of the non-limiting embodiment or aspect of the process shown in FIG. 3 according to the principles of the presently disclosed subject matter.

Referring now to FIG. 13, FIG. 13 is a diagram of an exemplary implementation 1300 of a non-limiting embodiment relating to process 300 shown in FIG. 3. As shown in FIG. 13, implementation 1300 may include at least one knowledgebase 1360, at least one models database 1368, and/or the like. In some non-limiting embodiments or aspects, knowledgebase 1360 and models database 1368 may be the same database. In some non-limiting embodiments or aspects, knowledgebase 1360 may be the same as or similar to one or more of the behavior trees database 462, strategies database 464, goals tree database 466, ML/AI templates database 468, successful traits database 470, immunity knowledge database 472, knowledgebase 560, template database 668, knowledge base 860, knowledgebases 960a, 960b, device database 1076, knowledgebases 1060a, 1060b, knowledgebases 1160a, 1160b, 1160c, knowledgebase 1260, models database 1268, data transform database 1278, and/or the like. In some non-limiting embodiments or aspects, models database 1368 may be the same as or similar to ML/AI templates database 468. In some non-limiting embodiments or aspects, knowledgebase 1360 and/or models database 1368 may be part of or similar to transaction service provider system 102 (e.g., one or more devices of transaction service provider system 102). In some non-limiting embodiments or aspects, one or more of knowledgebase 1360 and/or models database 1368 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, knowledgebase 1360 may include an external database. In some non-limiting embodiments or aspects, one or more of the steps of implementation 1300 may be performed (e.g., completely, partially, and/or the like) by transaction service provider system 102 (e.g., one or more devices of transaction service provider system 102). In some non-limiting embodiments or aspects, one or more of the steps of implementation 1300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 13, at step 1302, implementation 1300 may include a starting point. As shown in FIG. 13, at step 1304, implementation 1300 may include receiving (e.g., by transaction service provider system 102, another system, another device, and/or the like) target vector data (e.g., a vector representation of features such as accounts, entities (e.g., merchants, issuers, etc.), transactions of interest, and/or the like; settings associated with a desired predictive model based on the vector representation of features; and/or the like). In some non-limiting embodiments or aspects, when target vector data is received, dynamic, real-time decision making may be beneficial. As such, at least one predictive learning model may be useful in determining information about the target vector data. For example, such information may include at least one automatically generated predictive model based on the target vector data and/or the like.

As shown in FIG. 13, at step 1306, implementation 1300 may include loading a master template (e.g., master template for automatic predictive model generation), as described herein. The master template may be initialized, e.g., by transaction service provider system 102, another system, another device, and/or the like.

As shown in FIG. 13, at step 1308, implementation 1300 may include loading (e.g., by transaction service provider system 102, another system, another device, and/or the like) additional templates (e.g., agent template(s), predictive model template(s), goal template(s), and/or the like), as described herein.

As shown in FIG. 13, at step 1310, implementation 1300 may include providing (e.g., receiving, communicating, storing, and/or the like) the target vector data, as described herein. For example, the target vector data may be communicated, e.g., by transaction service provider system 102, another system, another device, and/or the like.

As shown in FIG. 13, at step 1312, implementation 1300 may include consolidating a request. For example, a request may be consolidated (e.g., by transaction service provider system 102, another system, another device, and/or the like) based on the loaded templates, target vector data, data from knowledgebase 1360, and/or the like.

As shown in FIG. 13, at step 1314, implementation 1300 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 13, at step 1316, implementation 1300 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning process(es) at step 1314 may be repeated. If the goal data is satisfied, implementation 1300 may proceed to the next step(s).

As shown in FIG. 13, at step 1318, implementation 1300 may include providing (e.g., storing, communicating, and/or the like) the final agent(s) and/or model(s) (e.g., predictive model templates) after the learning process(es), as described herein. For example, the final agent(s) and/or model(s) may be provided, e.g., by transaction service provider system 102, another system, another device, and/or the like. Additionally or alternatively, the final agent(s) and/or model(s) may be stored in models database 1368.

As shown in FIG. 13, at step 1320, implementation 1300 may include communicating (e.g., sending, transmitting, displaying, and/or the like) a response associated with the final agent(s) and/or model(s). For example, the response may be communicated (e.g., by transaction service provider system 102, another system, another device, and/or the like) based on the final agent(s)/model(s) (e.g., as stored in models database 1368), and/or the like. In some non-limiting embodiments or aspects, the response may include the automatically generated model(s). In some non-limiting embodiments or aspects, the response may include a code, a formatted representation of the automatically generated model(s) (e.g., XML or PMML formatted), and/or the like.

As shown in FIG. 13, at step 1322, implementation 1300 may include an ending point.

Figure 14:
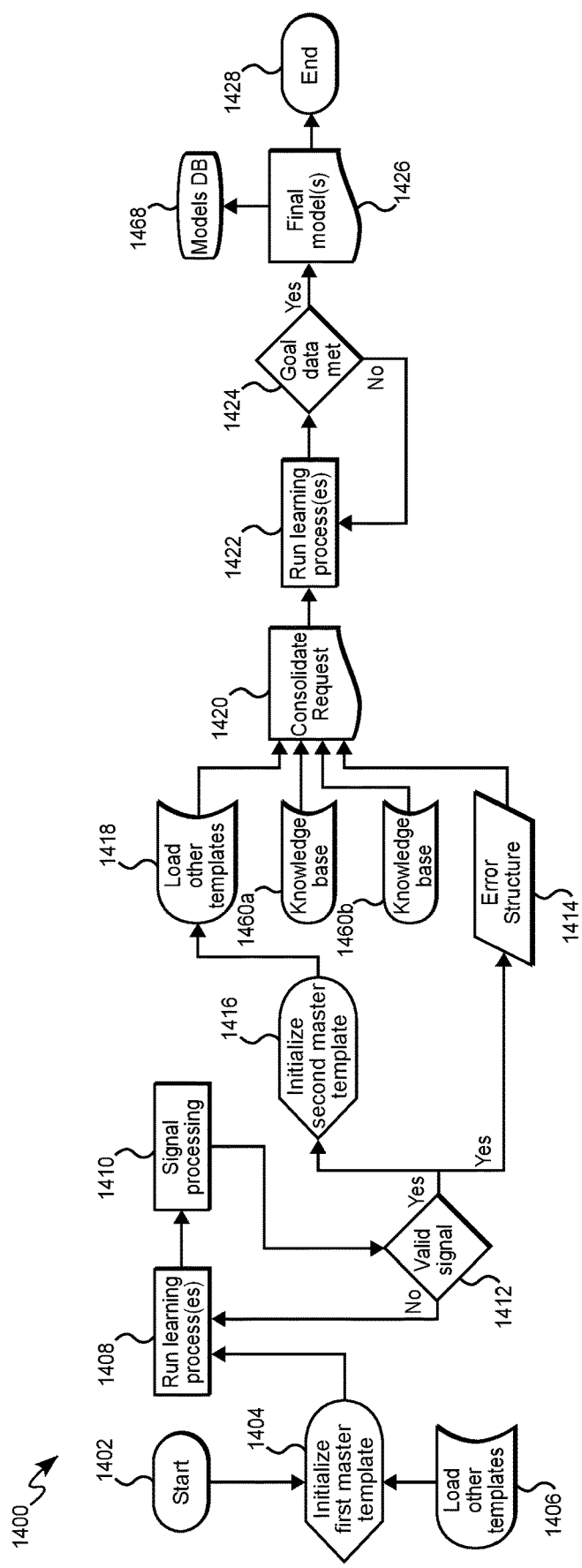
FIG. 14 is a diagram of some non-limiting embodiments or aspects of an implementation of the non-limiting embodiment or aspect of the process shown in FIG. 3 according to the principles of the presently disclosed subject matter.

Referring now to FIG. 14, FIG. 14 is a diagram of an exemplary implementation 1400 of a non-limiting embodiment relating to process 300 shown in FIG. 3. As shown in FIG. 14, implementation 1400 may include at least one knowledgebase 1460a, 1460b, at least one models database 1468, and/or the like. In some non-limiting embodiments or aspects, knowledgebases 1460a. 1460b and models database 1468 may be the same database. In some non-limiting embodiments or aspects, knowledgebases 1460a, 1460b may be the same as or similar to one or more of the behavior trees database 462, strategies database 464, goals tree database 466, ML/AI templates database 468, successful traits database 470, immunity knowledge database 472, knowledgebase 560, template database 668, knowledge base 860, knowledgebases 960a, 960b, device database 1076, knowledgebases 1060a, 1060b, knowledgebases 1160a, 1160b, 1160c, knowledgebase 1260, models database 1268, data transform database 1278, knowledgebase 1360, models database 1368, and/or the like. In some non-limiting embodiments or aspects, models database 1468 may be the same as or similar to ML/AI templates database 468. In some non-limiting embodiments or aspects, knowledgebases 1460a, 1460b and/or models database 1468 may be part of or similar to transaction service provider system 102 (e.g., one or more devices of transaction service provider system 102). In some non-limiting embodiments or aspects, one or more of knowledgebases 1460a, 1460b and/or models database 1468 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, at least one of knowledgebases 1460a, 1460b may include an external database. In some non-limiting embodiments or aspects, one or more of the steps of implementation 1400 may be performed (e.g., completely, partially, and/or the like) by transaction service provider system 102 (e.g., one or more devices of transaction service provider system 102). In some non-limiting embodiments or aspects, one or more of the steps of implementation 1400 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 14, at step 1402, implementation 1400 may include a starting point. As shown in FIG. 14, at step 1404, implementation 1400 may include loading a first master template (e.g., master template for automatic predictive model generation), as described herein. The master template may be initialized, e.g., by transaction service provider system 102, another system, another device, and/or the like.

As shown in FIG. 14, at step 1406, implementation 1400 may include loading (e.g., by transaction service provider system 102, another system, another device, and/or the like) additional templates (e.g., agent template(s), predictive model template(s), goal template(s), and/or the like), as described herein.

As shown in FIG. 14, at step 1408, implementation 1400 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 14, at step 1410, implementation 1400 may include signal processing. In some non-limiting embodiments or aspects, a signal based on the agent(s)/ model(s) (e.g., a signal based on the output of the model(s) after the learning process(es) and/or the liked) may be processed (e.g., by transaction service provider system 102, another system, another device, and/or the like). In some non-limiting embodiments or aspects, a set of filters (e.g., signal processing filters, Kalman filters, and/or the like) may decompose incoming signals to enable rapid detection of concept drift and enable the agent(s)/model(s) to explore the data. In some non-limiting embodiments or aspects, at certain intervals (e.g., continuously; periodically, such as weekly, daily, or hourly; after predefined periods, such as after each epoch or after each run of learning process(es); and/or the like), a set of Kalman filters (e.g., including at least one Kalman filter) may be updated, an oldest filter may be removed from the set of Kalman filters (e.g., to account for drift), and/or the like. In some non-limiting embodiments or aspects, the size of the set of Kalman filters may be determined based on stability of the input over time. For example, greater/increased stability may be associated with a decreased size of the ensemble, and lesser/decreased stability may be associated with an increased size of the ensemble. In some non-limiting embodiments or aspects, a signal processing score may be determined based on a weighted average of the set of filters (e.g., which may be based on a weighted average from when the set of filters was created/initialized). Additionally or alternatively, a weight associated with each filter may depend on the stability and temporal shape of the signal (e.g., stability and temporal shape may affect whether greater weight is given/applied to the first and/or earlier filters or given/applied to the last and/or later filters). In some non-limiting embodiments or aspects, if the signal processing score exceeds a threshold (e.g., predefined threshold and/or the like), an alert may be sent.

As shown in FIG. 14, at step 1412, implementation 1400 may include determining whether the signal is valid (e.g., based on whether goal data associated with such signal is satisfied, as described herein). In some non-limiting embodiments or aspects, a determination of whether the signal is valid may be performed (e.g., by transaction service provider system 102, another system, another device, and/or the like) based on a goal template, as described herein. If the signal is not valid (e.g., goal data is not satisfied), the learning processes at step 1408 may be repeated. If the goal data is satisfied, implementation 1400 may proceed to the next step(s).

As shown in FIG. 14, at step 1414, implementation 1400 may include providing (e.g., receiving, communicating, storing, calculating, and/or the like) error data (e.g., error structure, error value(s), residuals, performance metrics, and/or the like), as described herein. For example, the error data may be provided, e.g., by transaction service provider system 102, another system, another device, and/or the like. In some non-limiting embodiments or aspects, the error data may be associated with a prediction error of the agent(s)/model(s) resulting from the first master template and the learning process(es) at steps 1408-1412.

As shown in FIG. 14, at step 1416, implementation 1400 may include loading a second master template (e.g., master template for automatic predictive model rebuilding), as described herein. The master template may be initialized, e.g., by transaction service provider system 102, another system, another device, and/or the like.

As shown in FIG. 14, at step 1418, implementation 1400 may include loading (e.g., by transaction service provider system 102, another system, another device, and/or the like) additional templates (e.g., agent template(s), predictive model template(s), goal template(s), and/or the like), as described herein.

As shown in FIG. 14, at step 1420, implementation 1400 may include consolidating a request. For example, a request may be consolidated (e.g., by transaction service provider system 102, another system, another device, and/or the like) based on the loaded templates, error data, data from knowledgebases 1460*a*, 1460*b*, and/or the like.

As shown in FIG. 14, at step 1422, implementation 1400 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 14, at step 1424, implementation 1400 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning processes at step 1414 may be repeated. If the goal data is satisfied, implementation 1400 may proceed to the next step(s).

As shown in FIG. 14, at step 1426, implementation 1400 may include providing (e.g., storing, communicating, and/or the like) the final (e.g., rebuilt) agent(s) and/or model(s) (e.g., predictive model templates after the second learning process(es) at step 1422), as described herein. For example, the final (e.g., rebuilt) agent(s) and/or model(s) may be provided, e.g., by transaction service provider system 102, another system, another device, and/or the like. Additionally or alternatively, the final agent(s) and/or model(s) may be stored in models database 1468.

As shown in FIG. 14, at step 1428, implementation 1400 may include an ending point.

Figure 15:
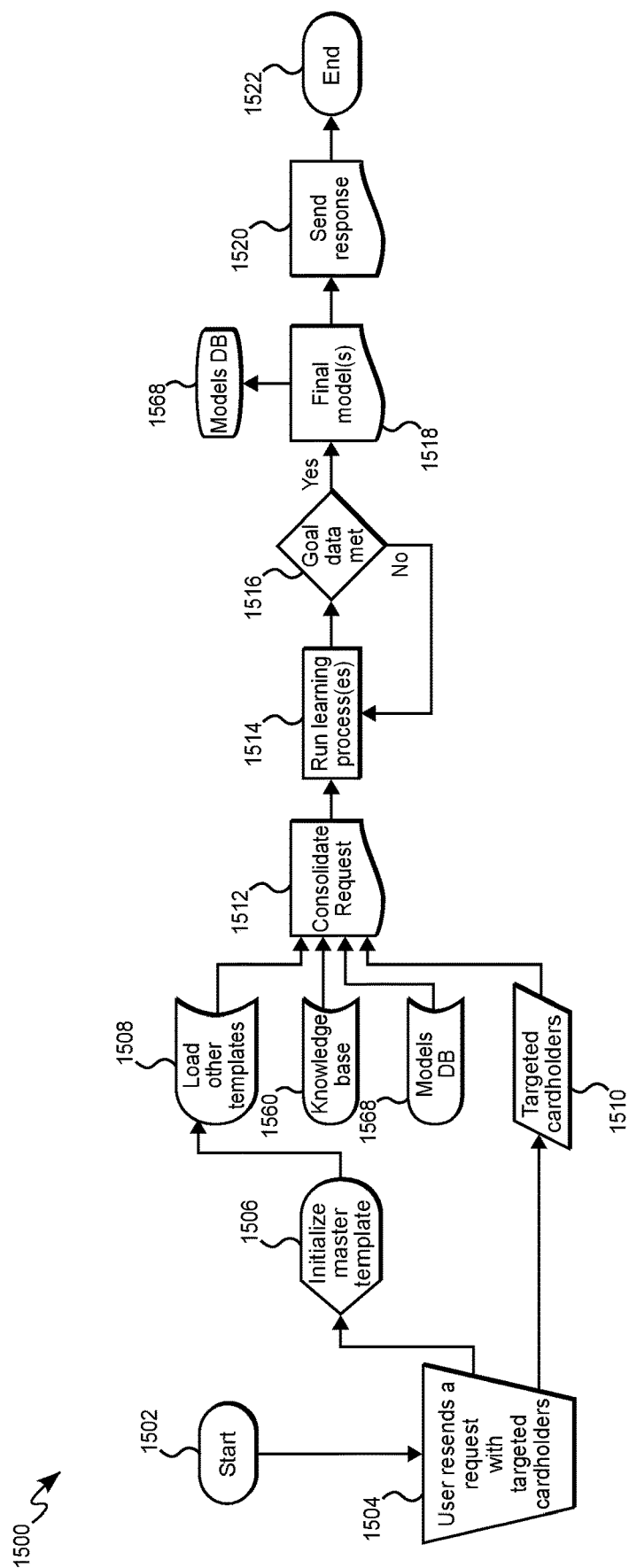
FIG. 15 is a diagram of some non-limiting embodiments or aspects of an implementation of the non-limiting embodiment or aspect of the process shown in FIG. 3 according to the principles of the presently disclosed subject matter.

Referring now to FIG. 15, FIG. 15 is a diagram of an exemplary implementation 1500 of a non-limiting embodiment relating to process 300 shown in FIG. 3. As shown in FIG. 15, implementation 1500 may include at least one knowledgebase 1560, at least one models database 1568, and/or the like. In some non-limiting embodiments or aspects, knowledgebase 1560 and models database(s) 1568 may be the same database. In some non-limiting embodiments or aspects, knowledgebase 1560 may be the same as or similar to one or more of the behavior trees database 462, strategies database 464, goals tree database 466, ML/AI templates database 468, successful traits database 470, immunity knowledge database 472, knowledgebase 560, template database 668, knowledge base 860, knowledgebases 960*a*, 960*b*, device database 1076, knowledgebases 1060*a*, 1060*b*, knowledgebases 1160*a*, 1160*b*, 1160*c*, knowledgebase 1260, models database 1268, data transform database 1278, knowledgebase 1360, models database 1368, knowledgebases 1460*a*, 1460*b*, models database 1468, and/or the like. In some non-limiting embodiments or aspects, models database(s) 1568 may be the same as or similar to ML/AI templates database 468. In some non-limiting embodiments or aspects, knowledgebase 1560 and/or models database(s) 1568 may be part of or similar to transaction service provider system 102 (e.g., one or more devices of transaction service provider system 102). In some non-limiting embodiments or aspects, one or more of knowledgebase 1560 and/or models database(s) 1568 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, knowledgebase 1560 may include an external database. In some non-limiting embodiments or aspects, one or more of the steps of implementation 1500 may be performed (e.g., completely, partially, and/or the like) by transaction service provider system 102 (e.g., one or more devices of transaction service provider system 102). In some non-limiting embodiments or aspects, one or more of the steps of implementation 1500 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 15, at step 1502, implementation 1500 may include a starting point. As shown in FIG. 15, at step 1504, implementation 1500 may include receiving (e.g., by transaction service provider system 102, another system, another device, and/or the like) customer transaction data associated with at least one customer (e.g., payment transaction data, customer identification data, demographic data associated with the customer(s), census data associated with the customer(s), online profile data such as social media data associated with the customer(s), and/or the like). In some non-limiting embodiments or aspects, when customer transaction data is received, dynamic, real-time decision making may be beneficial. As such, at least one predictive learning model may be useful in determining information about the customer transaction data. For example, such information may include an automatically generated model and/or hypothesis representing the customer's habits (e.g., spending/consumption habits, daily travel routines, and/or the like), a graph database based on the customer and/or a community of customers, and/or the like.

As shown in FIG. 15, at step 1506, implementation 1500 may include loading a master template (e.g., master template for automatic generation of models of customer habits and/or the like), as described herein. The master template may be initialized, e.g., by transaction service provider system 102, another system, another device, and/or the like.

As shown in FIG. 15, at step 1508, implementation 1500 may include loading (e.g., by transaction service provider system 102, another system, another device, and/or the like) additional templates (e.g., agent template(s), predictive model template(s), goal template(s), and/or the like), as described herein.

As shown in FIG. 15, at step 1510, implementation 1500 may include providing (e.g., receiving, communicating, storing, and/or the like) the customer transaction data, as described herein. For example, the customer transaction data may be provided, e.g., by transaction service provider system 102, another system, another device, and/or the like.

As shown in FIG. 15, at step 1512, implementation 1500 may include consolidating a request. For example, a request may be consolidated (e.g., by transaction service provider system 102, another system, another device, and/or the like) based on the loaded templates, customer transaction data, data from knowledgebase 1560, models database 1568, and/or the like.

As shown in FIG. 15, at step 1514, implementation 1500 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 15, at step 1516, implementation 1500 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning processes at step 1514 may be repeated. If the goal data is satisfied, implementation 1500 may proceed to the next step(s).

As shown in FIG. 15, at step 1518, implementation 1500 may include providing (e.g., storing, communicating, and/or the like) the final agent(s) and/or model(s) (e.g., predictive model templates) after the learning process(es), as described herein. For example, the final agent(s) and/or model(s) may be provided, e.g., by transaction service provider system 102, another system, another device, and/or the like. Additionally or alternatively, the final agent(s) and/or model(s) may be stored in models database 1568.

As shown in FIG. 15, at step 1520, implementation 1500 may include communicating (e.g., sending, transmitting, displaying, and/or the like) a response, as described herein. For example, the response may be communicated (e.g., by transaction service provider system 102, another system, another device, and/or the like) based on the final agent(s)/model(s) (e.g., as stored in models database 1568), and/or the like. In some non-limiting embodiments or aspects, the response may include the automatically generated model(s). In some non-limiting embodiments or aspects, the response may include a code, a formatted representation of the automatically generated model(s) (e.g., XML or PMML formatted), and/or the like.

As shown in FIG. 15, at step 1522, implementation 1500 may include an ending point.

Figure 16:
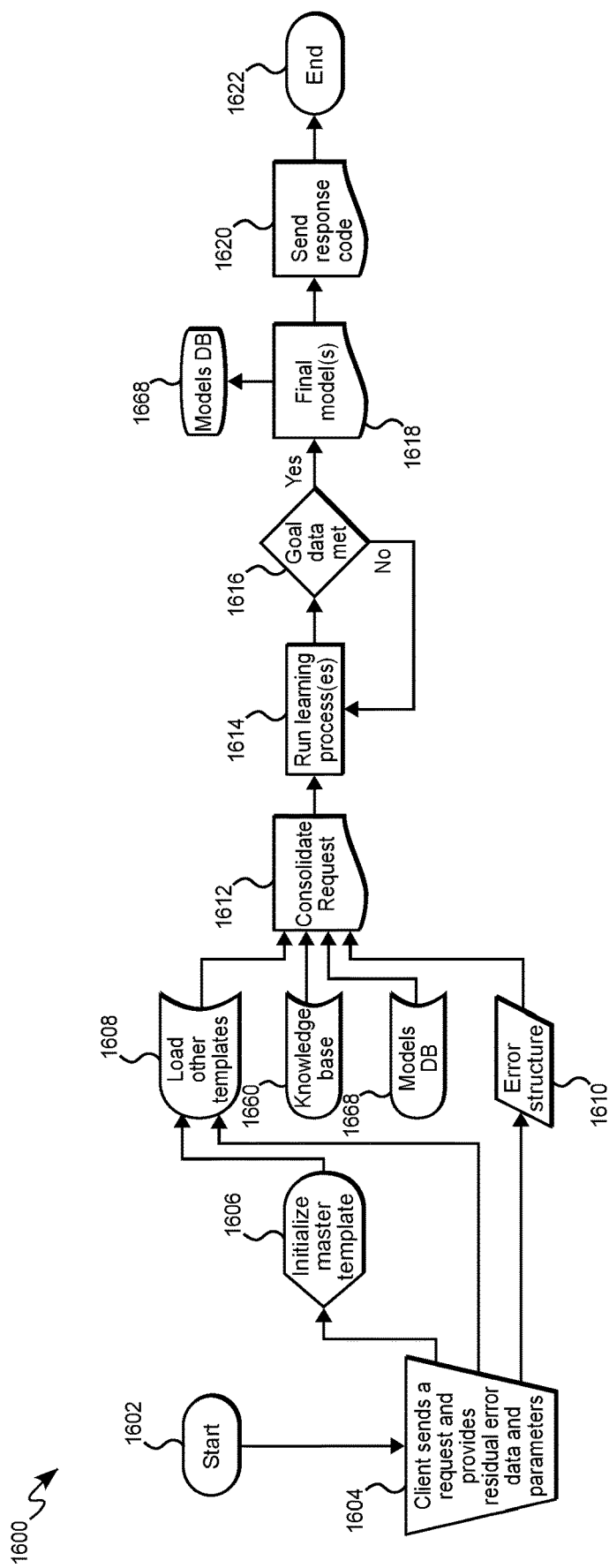
FIG. 16 is a diagram of some non-limiting embodiments or aspects of an implementation of the non-limiting embodiment or aspect of the process shown in FIG. 3 according to the principles of the presently disclosed subject matter.

Referring now to FIG. 16, FIG. 16 is a diagram of an exemplary implementation 1600 of a non-limiting embodiment relating to process 300 shown in FIG. 3. As shown in FIG. 16, implementation 1600 may include at least one knowledgebase 1660a, at least one models database 1668, and/or the like. In some non-limiting embodiments or aspects, knowledgebase 1660a and models database(s) 1668 may be the same database. In some non-limiting embodiments or aspects, knowledgebase 1660a may be the same as or similar to one or more of the behavior trees database 462, strategies database 464, goals tree database 466, ML/AI templates database 468, successful traits database 470, immunity knowledge database 472, knowledgebase 560, template database 668, knowledge base 860, knowledgebases 960a, 960b, device database 1076, knowledgebases 1060a, 1060b, knowledgebases 1160a, 1160b, 1160c, knowledgebase 1260, models database 1268, data transform database 1278, knowledgebase 1360, models database 1368, knowledgebases 1460a, 1460b, models database 1468, knowledgebase 1560, models database 1568, and/or the like. In some non-limiting embodiments or aspects, models database(s) 1668 may be the same as or similar to ML/AI templates database 468. In some non-limiting embodiments or aspects, knowledgebase 1660a and/or models database(s) 1668 may be part of or similar to transaction service provider system 102 (e.g., one or more devices of transaction service provider system 102). In some non-limiting embodiments or aspects, one or more of knowledgebase 1660a and/or models database(s) 1668 may be part of or similar to another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments or aspects, knowledgebase 1660a may include an external database. In some non-limiting embodiments or aspects, one or more of the steps of implementation 1600 may be performed (e.g., completely, partially, and/or the like) by transaction service provider system 102 (e.g., one or more devices of transaction service provider system 102). In some non-limiting embodiments or aspects, one or more of the steps of implementation 1600 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 16, at step 1602, implementation 1600 may include a starting point. As shown in FIG. 16, at step 1604, implementation 1600 may include receiving (e.g., by transaction service provider system 102, another system, another device, and/or the like) client model error data (e.g., error structure, error value(s), residuals, performance metrics, and/or the like) associated with a predictive model from at least one client device (e.g., a device of merchant system 108, customer device 106, a device of issuer system 104, a device of acquirer system 110, and/or the like). In some non-limiting embodiments or aspects, when client model error data is received, dynamic, real-time decision making may be beneficial. As such, at least one predictive learning model may be useful in determining information about the client model error data. For example, such information may include an automatically generated/rebuilt predictive model (e.g., a predictive model for fraud detection in payment transactions), and/or the like.

As shown in FIG. 16, at step 1606, implementation 1600 may include loading a master template (e.g., master template for automatic generation and/or rebuilding of predictive models, such as predictive models for fraud detection in payment transactions, and/or the like), as described herein. The master template may be initialized, e.g., by transaction service provider system 102, another system, another device, and/or the like.

As shown in FIG. 16, at step 1608, implementation 1600 may include loading (e.g., by transaction service provider system 102, another system, another device, and/or the like) additional templates (e.g., agent template(s), predictive model template(s), goal template(s), and/or the like), as described herein.

As shown in FIG. 16, at step 1610, implementation 1600 may include providing (e.g., receiving, communicating, storing, and/or the like) the client model error data, as described herein. For example, the client model error data may be provided, e.g., by transaction service provider system 102, merchant system 108, customer device 106, issuer system 104, acquirer system 110, another system, another device, and/or the like.

As shown in FIG. 16, at step 1612, implementation 1600 may include consolidating a request. For example, a request may be consolidated (e.g., by transaction service provider system 102, another system, another device, and/or the like) based on the loaded templates, customer transaction data, data from knowledgebase 1660a, models database 1668, and/or the like.

As shown in FIG. 16, at step 1614, implementation 1600 may include running learning process(es). In some non-limiting embodiments or aspects, such learning process(es) may be the same as or similar to process 300 and/or the epoch portions thereof, implementation 400 and/or the epoch portion(s) thereof, and/or the like, as described herein.

As shown in FIG. 16, at step 1616, implementation 1600 may include determining whether goal data is satisfied, as described herein. In some non-limiting embodiments or aspects, a determination of whether the goal data is satisfied may be performed (e.g., by transaction service provider system 102, another system, another device, and/or the like) based on a goal template, as described herein. If the goal data is not satisfied, the learning processes at step 1614 may be repeated. If the goal data is satisfied, implementation 1600 may proceed to the next step(s).

As shown in FIG. 16, at step 1618, implementation 1600 may include providing (e.g., storing, communicating, and/or the like) the final agent(s) and/or model(s) (e.g., predictive model templates) after the learning process(es), as described herein. For example, the final agent(s) and/or model(s) may be provided, e.g., by transaction service provider system 102, another system, another device, and/or the like. Additionally or alternatively, the final agent(s) and/or model(s) may be stored in models database 1668.

As shown in FIG. 16, at step 1620, implementation 1600 may include communicating (e.g., sending, transmitting, displaying, and/or the like) a response, as described herein. For example, the response may be communicated (e.g., by transaction service provider system 102, another system, another device, and/or the like) based on the final agent(s)/model(s) (e.g., as stored in models database 1668), and/or the like. In some non-limiting embodiments or aspects, the response may include the automatically generated/rebuilt model(s). In some non-limiting embodiments or aspects, the response may include a code, a formatted representation of the automatically generated/rebuilt model(s) (e.g., XML or PMML formatted), and/or the like.

As shown in FIG. 16, at step 1622, implementation 1600 may include an ending point.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for controlling genetic learning for predictive models using predefined strategies, comprising:
    loading, with at least one processor, a master template comprising a number of agents of a plurality of agents, wherein the master template further comprises goal data associated with at least one condition;
    for each agent of the plurality of agents:
        selecting, with at least one processor, a type of predictive model from a plurality of types of predictive models as an agent predictive model;
        selecting, with at least one processor, a strategy from a plurality of predefined strategies as an agent strategy;
        generating, with at least one processor, a plurality of candidate genomes, each candidate genome comprising a plurality of genes, each gene associated with a respective feature of the agent predictive model;
        determining, with at least one processor, a fit of each candidate genome of the plurality of candidate genomes to the agent strategy; and
        selecting, with at least one processor, a candidate genome from the plurality of candidate genomes as the agent genome based on the fit of the candidate genome;
    for each epoch of a plurality of epochs:
        for each agent of the plurality of agents:
            performing, with at least one processor, a plurality of training iterations based on the agent predictive model and the agent genome; and
            determining, with at least one processor, a fitness of the agent predictive model after the plurality of training iterations;
        determining, with at least one processor, a first subset of agents with a highest fitness;
        for each agent of the first subset of agents:
            generating, with at least one processor, at least one new agent to add to the plurality of agents; and
            merging, with at least one processor, a genome of the at least one new agent with the agent genome of at least one agent of the first subset of agents; and determining, with at least one processor, whether the at least one agent predictive model of the plurality of agents satisfies the at least one condition associated with the goal data; and terminating, with at least one processor, the plurality of epochs based on determining the at least one agent predictive model of the plurality of agents satisfies the at least one condition associated with the goal data.

2. The method of claim 1, wherein the master template further comprises a plurality of agent templates, wherein selecting the type of predictive model comprises selecting, with at least one processor, the type of predictive model based on a subset of the plurality of types of predictive models associated with a respective agent template of the plurality of agent templates for each agent.

3. The method of claim 1, further comprising, for each epoch of the plurality of epochs:
determining, with at least one processor, a second subset of agents with a lowest fitness.

4. The method of claim 3, further comprising, for each epoch of the plurality of epochs:
filtering, with at least one processor, the at least one new agent based on the second subset of agents.

5. The method of claim 1, wherein generating the at least one new agent comprises generating, with at least one processor, at least three new agents.

6. A method for controlling genetic learning for predictive models using predefined strategies, comprising:
loading, with at least one processor, a master template comprising a number of agents of a plurality of agents, wherein the master template further comprises goal data associated with at least one condition;
for each agent of the plurality of agents:
selecting, with at least one processor, a type of predictive model from a plurality of types of predictive models as an agent predictive model;
selecting, with at least one processor, a strategy from a plurality of predefined strategies as an agent strategy;
generating, with at least one processor, a plurality of candidate genomes, each candidate genome comprising a plurality of genes, each gene associated with a respective feature of the agent predictive model;
determining, with at least one processor, a fit of each candidate genome of the plurality of candidate genomes to the agent strategy; and
selecting, with at least one processor, a candidate genome from the plurality of candidate genomes as the agent genome based on the fit of the candidate genome;
for each epoch of a plurality of epochs:
for each agent of the plurality of agents:
performing, with at least one processor, a plurality of training iterations based on the agent predictive model and the agent genome; and
determining, with at least one processor, a fitness of the agent predictive model after the plurality of training iterations;
determining, with at least one processor, a first subset of agents with a highest fitness;
for each agent of the first subset of agents:
generating, with at least one processor, at least one new agent to add to the plurality of agents; and
merging, with at least one processor, a genome of the at least one new agent with the agent genome of at least one agent of the first subset of agents, wherein the master template further comprises a plurality of agent templates, wherein selecting the type of predictive model comprises selecting, with at least one processor, the type of predictive model based on a subset of the plurality of types of predictive models associated with a respective agent template of the plurality of agent templates for each agent, wherein each agent template of the plurality of agent templates further comprises at least one predictive model template, wherein selecting the type of predictive model comprises selecting, with at least one processor, one of the at least one predictive model template based on the respective agent template for each agent.

7. A method for controlling genetic learning for predictive models using predefined strategies, comprising:
for each agent of a plurality of agents:
selecting, with at least one processor, a type of predictive model from a plurality of types of predictive models as an agent predictive model;
selecting, with at least one processor, a strategy from a plurality of predefined strategies as an agent strategy;
generating, with at least one processor, a plurality of candidate genomes, each candidate genome comprising a plurality of genes, each gene associated with a respective feature of the agent predictive model;
determining, with at least one processor, a fit of each candidate genome of the plurality of candidate genomes to the agent strategy; and
selecting, with at least one processor, a candidate genome from the plurality of candidate genomes as the agent genome based on the fit of the candidate genome;
for each epoch of a plurality of epochs:
for each agent of the plurality of agents:
performing, with at least one processor, a plurality of training iterations based on the agent predictive model and the agent genome; and
determining, with at least one processor, a fitness of the agent predictive model after the plurality of training iterations;
determining, with at least one processor, a first subset of agents with a highest fitness;
for each agent of the first subset of agents:
generating, with at least one processor, at least one new agent to add to the plurality of agents; and
merging, with at least one processor, a genome of the at least one new agent with the agent genome of at least one agent of the first subset of agents, wherein generating the at least one new agent comprises generating, with at least one processor, at least three new agents, wherein the at least three new agents comprise a first new agent, a second new agent, and a third new agent, and wherein merging the genome of the at least one new agent with the agent genome of at least one agent of the first subset of agents comprises:
merging, with at least one processor, the genome of the first new agent with the agent genome of a first agent of the first subset of agents having a most different strategy;
merging, with at least one processor, the genome of the second new agent with the agent genome of a second agent of the first subset of agents having a highest fitness; and merging, with at least one processor, the genome of the third new agent with the agent genome of a third agent of the first subset of agents having a most similar winning strategy.

8. A system for controlling genetic learning for predictive models using predefined strategies, comprising:
   at least one processor; and
   at least one non-transitory computer-readable medium including one or more instructions that, when executed by at least one processor, cause the at least one processor to:
      load a master template comprising a number of agents of a plurality of agents, wherein the master template further comprises goal data associated with at least one condition;
      for each agent of the plurality of agents:
         select a type of predictive model from a plurality of types of predictive models as an agent predictive model;
         select a strategy from a plurality of predefined strategies as an agent strategy;
         generate a plurality of candidate genomes, each genome comprising a plurality of genes, each gene associated with a respective feature of the agent predictive model;
         determine a fit of each candidate genome of the plurality of candidate genomes to the agent strategy; and
         select a candidate genome from the plurality of candidate genomes as the agent genome based on the fit of the candidate genome;
      for each epoch of a plurality of epochs:
         for each agent of the plurality of agents:
            perform a plurality of training iterations based on the agent predictive model and the agent genome; and
            determine a fitness of the agent predictive model after the plurality of training iterations;
         determine a first subset of agents with a highest fitness;
         for each agent of the first subset of agents:
            generate at least one new agent to add to the plurality of agents; and
            merge a genome of the at least one new agent with the agent genome of at least one agent of the first subset of agents; and
         determine whether the at least one agent predictive model of the plurality of agents satisfies the at least one condition associated with the goal data; and
      terminate the plurality of epochs based on determining the at least one agent predictive model of the plurality of agents satisfies the at least one condition associated with the goal data.

9. The system of claim 8, wherein the master template further comprises a plurality of agent templates, wherein selecting the type of predictive model comprises selecting the type of predictive model based on a subset of the plurality of types of predictive models associated with a respective agent template of the plurality of agent templates for each agent.

10. The system of claim 8, wherein the one or more instructions, when executed by the at least one processor, further cause the at least one processor to, for each epoch of the plurality of epochs:
   determine a second subset of agents with a lowest fitness.

11. The system of claim 10, wherein the one or more instructions, when executed by the at least one processor, further cause the at least one processor to, for each epoch of the plurality of epochs:
   filter the at least one new agent based on the second subset of agents.

12. The system of claim 8, wherein generating the at least one new agent comprises generating at least three new agents.

13. A system for controlling genetic learning for predictive models using predefined strategies, comprising:
   at least one processor; and
   at least one non-transitory computer-readable medium including one or more instructions that, when executed by at least one processor, cause the at least one processor to:
      load a master template comprising a number of agents of a plurality of agents;
      for each agent of the plurality of agents:
         select a type of predictive model from a plurality of types of predictive models as an agent predictive model;
         select a strategy from a plurality of predefined strategies as an agent strategy;
         generate a plurality of candidate genomes, each genome comprising a plurality of genes, each gene associated with a respective feature of the agent predictive model;
         determine a fit of each candidate genome of the plurality of candidate genomes to the agent strategy; and
         select a candidate genome from the plurality of candidate genomes as the agent genome based on the fit of the candidate genome;
      for each epoch of a plurality of epochs:
         for each agent of the plurality of agents:
            perform a plurality of training iterations based on the agent predictive model and the agent genome; and
            determine a fitness of the agent predictive model after the plurality of training iterations;
         determine a first subset of agents with a highest fitness;
         for each agent of the first subset of agents:
            generate at least one new agent to add to the plurality of agents; and
            merge a genome of the at least one new agent with the agent genome of at least one agent of the first subset of agents,
   wherein the master template further comprises a plurality of agent templates, wherein selecting the type of predictive model comprises selecting the type of predictive model based on a subset of the plurality of types of predictive models associated with a respective agent template of the plurality of agent templates for each agent,
   wherein each agent template of the plurality of agent templates further comprises at least one predictive model template, wherein selecting the type of predictive model comprises selecting one of the at least one predictive model template based on the respective agent template for each agent.

14. A system for controlling genetic learning for predictive models using predefined strategies, comprising:

at least one processor; and at least one non-transitory computer-readable medium including one or more instructions that, when executed by at least one processor, cause the at least one processor to:

for each agent of a plurality of agents:
select a type of predictive model from a plurality of types of predictive models as an agent predictive model;
select a strategy from a plurality of predefined strategies as an agent strategy;
generate a plurality of candidate genomes, each genome comprising a plurality of genes, each gene associated with a respective feature of the agent predictive model;
determine a fit of each candidate genome of the plurality of candidate genomes to the agent strategy; and
select a candidate genome from the plurality of candidate genomes as the agent genome based on the fit of the candidate genome;

for each epoch of a plurality of epochs:
for each agent of the plurality of agents:
perform a plurality of training iterations based on the agent predictive model and the agent genome; and
determine a fitness of the agent predictive model after the plurality of training iterations;
determine a first subset of agents with a highest fitness;
for each agent of the first subset of agents:
generate at least one new agent to add to the plurality of agents; and
merge a genome of the at least one new agent with the agent genome of at least one agent of the first subset of agents, wherein generating the at least one new agent comprises generating at least three new agents, wherein the at least three new agents comprise a first new agent, a second new agent, and a third new agent, and wherein merging the genome of the at least one new agent with the agent genome of at least one agent of the first subset of agents comprises:
merging the genome of the first new agent with the agent genome of a first agent of the first subset of agents having a most different strategy;
merging the genome of the second new agent with the agent genome of a second agent of the first subset of agents having a highest fitness; and
merging the genome of the third new agent with the agent genome of a third agent of the first subset of agents having a most similar winning strategy.

15. A computer program product for controlling genetic learning for predictive models using predefined strategies, the computer program product comprising at least one non-transitory computer-readable medium including one or more instructions that, when executed by at least one processor, cause the at least one processor to:

load a master template comprising a number of agents of a plurality of agents, wherein the master template further comprises goal data associated with at least one condition;

for each agent of the plurality of agents:
select a type of predictive model from a plurality of types of predictive models as an agent predictive model;
select a strategy from a plurality of predefined strategies as an agent strategy;
generate a plurality of candidate genomes, each genome comprising a plurality of genes, each gene associated with a respective feature of the agent predictive model;
determine a fit of each candidate genome of the plurality of candidate genomes to the agent strategy; and
select a candidate genome from the plurality of candidate genomes as the agent genome based on the fit of the candidate genome;

for each epoch of a plurality of epochs:
for each agent of the plurality of agents:
perform a plurality of training iterations based on the agent predictive model and the agent genome; and
determine a fitness of the agent predictive model after the plurality of training iterations;
determine a first subset of agents with a highest fitness;
for each agent of the first subset of agents:
generate at least one new agent to add to the plurality of agents; and
merge a genome of the at least one new agent with the agent genome of at least one agent of the first subset of agents; and
determine whether the at least one agent predictive model of the plurality of agents satisfies the at least one condition associated with the goal data; and terminate the plurality of epochs based on determining the at least one agent predictive model of the plurality of agents satisfies the at least one condition associated with the goal data.

16. A computer program product for controlling genetic learning for predictive models using predefined strategies, the computer program product comprising at least one non-transitory computer-readable medium including one or more instructions that, when executed by at least one processor, cause the at least one processor to:

for each agent of a plurality of agents:
select a type of predictive model from a plurality of types of predictive models as an agent predictive model;
select a strategy from a plurality of predefined strategies as an agent strategy;
generate a plurality of candidate genomes, each genome comprising a plurality of genes, each gene associated with a respective feature of the agent predictive model;
determine a fit of each candidate genome of the plurality of candidate genomes to the agent strategy; and
select a candidate genome from the plurality of candidate genomes as the agent genome based on the fit of the candidate genome;

for each epoch of a plurality of epochs:
for each agent of the plurality of agents:
perform a plurality of training iterations based on the agent predictive model and the agent genome; and
determine a fitness of the agent predictive model after the plurality of training iterations;
determine a first subset of agents with a highest fitness;
for each agent of the first subset of agents:
generate at least one new agent to add to the plurality of agents; and
merge a genome of the at least one new agent with the agent genome of at least one agent of the first subset of agents, wherein generating the at least one new agent comprises generating at least three new agents comprising a first new agent, a second new agent, and a third new agent, and wherein merging the genome of the at least one new agent with the agent genome of at least one agent of the first subset of agents comprises:
  merging the genome of the first new agent with the agent genome of a first agent of the first subset of agents having a most different strategy;
  merging the genome of the second new agent with the agent genome of a second agent of the first subset of agents having a highest fitness; and
  merging the genome of the third new agent with the agent genome of a third agent of the first subset of agents having a most similar winning strategy.

17. A computer program product for controlling genetic learning for predictive models using predefined strategies, the computer program product comprising at least one non-transitory computer-readable medium including one or more instructions that, when executed by at least one processor, cause the at least one processor to:
  load a master template comprising a number of agents of a plurality of agents, wherein the master template further comprises goal data associated with at least one condition;
  for each agent of the plurality of agents:
    select a type of predictive model from a plurality of types of predictive models as an agent predictive model;
    select a strategy from a plurality of predefined strategies as an agent strategy;
    generate a plurality of candidate genomes, each genome comprising a plurality of genes, each gene associated with a respective feature of the agent predictive model;
    determine a fit of each candidate genome of the plurality of candidate genomes to the agent strategy; and
    select a candidate genome from the plurality of candidate genomes as the agent genome based on the fit of the candidate genome;
  for each epoch of a plurality of epochs:
    for each agent of the plurality of agents:
      perform a plurality of training iterations based on the agent predictive model and the agent genome; and
      determine a fitness of the agent predictive model after the plurality of training iterations;
    determine a first subset of agents with a highest fitness;
    for each agent of the first subset of agents:
      generate at least one new agent to add to the plurality of agents; and
      merge a genome of the at least one new agent with the agent genome of at least one agent of the first subset of agents,
  wherein the master template further comprises a plurality of agent templates, wherein selecting the type of predictive model comprises selecting the type of predictive model based on a subset of the plurality of types of predictive models associated with a respective agent template of the plurality of agent templates for each agent,
  wherein each agent template of the plurality of agent templates further comprises at least one predictive model template, wherein selecting the type of predictive model comprises selecting one of the at least one predictive model template based on the respective agent template for each agent.

* * * * *